United States Patent
Klein et al.

(10) Patent No.: US 12,108,766 B2
(45) Date of Patent: Oct. 8, 2024

(54) USE OF A STRUCTURAL POLYPEPTIDE FOR PLANT COATING

(71) Applicant: Amsilk GmbH, Panegg/Martinsried (DE)

(72) Inventors: Jens Klein, Pullach I. Isartal (DE); Lin Römer, Ottobrunn (DE); Andreas Schmideder, Velden (DE); Katharina Sturm, Munich (DE)

(73) Assignee: Amsilk GmbH, Planegg/Martinsried (DE)

( * ) Notice: Subject to any disclaimer, the term of this patent is extended or adjusted under 35 U.S.C. 154(b) by 157 days.

(21) Appl. No.: 17/263,499

(22) PCT Filed: Aug. 7, 2019

(86) PCT No.: PCT/EP2019/071186
§ 371 (c)(1),
(2) Date: Jan. 26, 2021

(87) PCT Pub. No.: WO2020/035361
PCT Pub. Date: Feb. 20, 2020

(65) Prior Publication Data
US 2021/0169087 A1    Jun. 10, 2021

(30) Foreign Application Priority Data

Aug. 17, 2018  (EP) ..................... 18189505
Jan. 31, 2019  (EP) ..................... 19154685

(51) Int. Cl.
| | | |
|---|---|---|
| A01H 1/04 | (2006.01) | |
| A01C 1/06 | (2006.01) | |
| A01G 7/06 | (2006.01) | |
| A01N 63/50 | (2020.01) | |

(52) U.S. Cl.
CPC ................ *A01N 63/50* (2020.01); *A01C 1/06* (2013.01); *A01G 7/06* (2013.01)

(58) Field of Classification Search
CPC ............. A01N 63/50; A01C 1/06; A01G 7/06
See application file for complete search history.

(56) References Cited

U.S. PATENT DOCUMENTS

| | | |
|---|---|---|
| 2014/0206851 A1 | 7/2014 | Rech et al. |
| 2017/0156356 A1 | 6/2017 | Omenetto et al. |

FOREIGN PATENT DOCUMENTS

| | | | | |
|---|---|---|---|---|
| CN | 105 145 689 A | 12/2015 | | |
| CN | 105 875 590 A | 8/2016 | | |
| CN | 106231919 A | 12/2016 | | |
| CN | 107 027 833 A | 8/2017 | | |
| EP | 3 170 393 A1 | 5/2017 | | |
| JP | 2010-254596 | * 11/2010 | ............... | A01N 3/02 |
| JP | 2010254596 A | 11/2010 | | |
| RO | 123 026 B1 | 7/2010 | | |
| RU | 2656158 C2 | 5/2018 | | |
| WO | 2006/008163 A2 | 1/2006 | | |
| WO | 2014/039702 A2 | 3/2014 | | |
| WO | 2015-134865 A1 | 9/2015 | | |
| WO | WO 2010/134865 | * 9/2015 | ........... | A23L 3/3526 |
| WO | 2017/064066 A1 | 4/2017 | | |

OTHER PUBLICATIONS

Bin et al. Suspended seed coating containing polypeptide and preparation method thereof (English translation of Chinese application CN105104376). pp. 1-7 (Year: 2015).*
International Search Report in PCT/EP2019/071186, mailed Nov. 11, 2019, 4 pages.
Pettit, ""Eerie" tree in Yorkshire covered in giant web created by caterpillars," Daily Mail Online, Jun. 13, 2018, pp. 1-11. Retrieved from the internet URL: https://www.dailymail.co.uk/sciencetech/article-5838861/Eerie-tree-Yorkshire-covered-giant-web-created-thousands-caterpillars.html.
Search Report in RU 2021106701, Mar. 4, 2022, 2 pages.

* cited by examiner

*Primary Examiner* — Keith O. Robinson
(74) *Attorney, Agent, or Firm* — Kilpatrick Townsend & Stockton LLP

(57) ABSTRACT

The present application relates to the use of a structural polypeptide such as silk derived polypeptide (preferably spider web derived polypeptide) for coating seed, plant, or plant part, preferably to protect against pest infestation. The present application further relates to a method for plant coating or plant seed coating and to a plant or plant seed coated with a structural polypeptide.

18 Claims, 3 Drawing Sheets

Specification includes a Sequence Listing.

SEQUENCE LISTING

```
<160> NUMBER OF SEQ ID NOS: 4

<210> SEQ ID NO 1
<211> LENGTH: 35
<212> TYPE: PRT
<213> ORGANISM: Artificial Sequence
<220> FEATURE:
<223> OTHER INFORMATION: synthetic
<220> FEATURE:
<221> NAME/KEY: DOMAIN
<222> LOCATION: (1)..(35)
<223> OTHER INFORMATION: Module C (ADF-4)

<400> SEQUENCE: 1

Gly Ser Ser Ala Ala Ala Ala Ala Ala Ala Ala Ser Gly Pro Gly Gly
1               5                   10                  15

Tyr Gly Pro Glu Asn Gln Gly Pro Ser Gly Pro Gly Gly Tyr Gly Pro
            20                  25                  30

Gly Gly Pro
        35

<210> SEQ ID NO 2
<211> LENGTH: 35
<212> TYPE: PRT
<213> ORGANISM: Artificial Sequence
<220> FEATURE:
<223> OTHER INFORMATION: synthetic
<220> FEATURE:
<221> NAME/KEY: DOMAIN
<222> LOCATION: (1)..(35)
<223> OTHER INFORMATION: Module Cc

<400> SEQUENCE: 2

Gly Ser Ser Ala Ala Ala Ala Ala Ala Ala Ala Ser Gly Pro Gly Gly
1               5                   10                  15

Tyr Gly Pro Glu Asn Gln Gly Pro Cys Gly Pro Gly Gly Tyr Gly Pro
            20                  25                  30

Gly Gly Pro
        35
```

```
<210> SEQ ID NO 3
<211> LENGTH: 124
<212> TYPE: PRT
<213> ORGANISM: Artificial Sequence
<220> FEATURE:
<223> OTHER INFORMATION: based on ADF-3
<220> FEATURE:
<221> NAME/KEY: DOMAIN
<222> LOCATION: (1)..(124)
<223> OTHER INFORMATION: NR3 (ADF-3)

<400> SEQUENCE: 3

Gly Ala Ala Ser Ala Ala Val Ser Val Gly Gly Tyr Gly Pro Gln Ser
1               5                   10                  15

Ser Ser Ala Pro Val Ala Ser Ala Ala Ala Ser Arg Leu Ser Ser Pro
            20                  25                  30

Ala Ala Ser Ser Arg Val Ser Ser Ala Val Ser Ser Leu Val Ser Ser
        35                  40                  45

Gly Pro Thr Asn Gln Ala Ala Leu Ser Asn Thr Ile Ser Ser Val Val
    50                  55                  60

Ser Gln Val Ser Ala Ser Asn Pro Gly Leu Ser Gly Cys Asp Val Leu
65                  70                  75                  80

Val Gln Ala Leu Leu Glu Val Val Ser Ala Leu Val Ser Ile Leu Gly
                85                  90                  95

Ser Ser Ser Ile Gly Gln Ile Asn Tyr Gly Ala Ser Ala Gln Tyr Thr
            100                 105                 110

Gln Met Val Gly Gln Ser Val Ala Gln Ala Leu Ala
        115                 120

<210> SEQ ID NO 4
<211> LENGTH: 109
<212> TYPE: PRT
<213> ORGANISM: Artificial Sequence
<220> FEATURE:
<223> OTHER INFORMATION: based on ADF-4
<220> FEATURE:
<221> NAME/KEY: DOMAIN
<222> LOCATION: (1)..(109)
<223> OTHER INFORMATION: NR4 (ADF-4)

<400> SEQUENCE: 4

Gly Ala Tyr Gly Pro Ser Pro Ser Ala Ser Ala Ser Val Ala Ala Ser
1               5                   10                  15

Arg Leu Ser Ser Pro Ala Ala Ser Ser Arg Val Ser Ser Ala Val Ser
            20                  25                  30

Ser Leu Val Ser Ser Gly Pro Thr Asn Gly Ala Ala Val Ser Gly Ala
        35                  40                  45

Leu Asn Ser Leu Val Ser Gln Ile Ser Ala Ser Asn Pro Gly Leu Ser
    50                  55                  60

Gly Cys Asp Ala Leu Val Gln Ala Leu Leu Glu Leu Val Ser Ala Leu
65                  70                  75                  80

Val Ala Ile Leu Ser Ser Ala Ser Ile Gly Gln Val Asn Val Ser Ser
                85                  90                  95

Val Ser Gln Ser Thr Gln Met Ile Ser Gln Ala Leu Ser
            100                 105
```

USE OF A STRUCTURAL POLYPEPTIDE FOR PLANT COATING

The present invention relates to the use of a structural polypeptide for plant coating or plant seed coating. The present invention further relates to a method for plant coating or plant seed coating. The present invention also relates to a plant or plant seed coated with a structural polypeptide.

REFERENCE TO SUBMISSION OF A SEQUENCE LISTING AS A TEXT FILE

The Sequence Listing written in file 095697-1233772_Sequence-Listing.txt created on Jan. 22, 2021, 4,096 bytes, machine format IBM-PC, MS-Windows operating system, is hereby incorporated by reference in its entirety for all purposes.

BACKGROUND OF THE INVENTION

Agricultural plants, fruits, vegetables, fruit trees, ornamental plants, and the like are seriously damaged by pests, in particular winged pests, such as whiteflies, aphids, and thrips. Numerous commercially valuable plants, including common agricultural crops, are susceptible to attacks by plant pests including insect and nematode pests causing substantial reductions in crop yield and quality. For example, plant pests are a major factor in the loss of the world's important agricultural crops. Insect pests are also a burden to vegetable and fruit growers, to producers of ornamental flowers, and to home gardeners.

Proposed means for controlling such pests are, for example, chemical, biological, or physical control means. Insect pests are mainly controlled by intensive application of chemical pesticides, which are active through inhibition of insect growth, prevention of insect feeding or reproduction, or cause death. Biological pest control agents have also been applied to crop plants with average success. Good insect control can, thus, be reached, but certain chemicals can sometimes also affect non-target beneficial insects and certain biologicals have a very narrow spectrum of activity. In addition, the continued use of certain chemical and biological control methods heightens the chance for insect pests to develop resistance to such control measures. Moreover, there is a problem that many chemicals have harmful effects on human and animals and, hence, cannot be used frequently. Some biological and physical controls are also effective but are not fully satisfactory in terms of cost, versatility, and so on under current situations.

Further, microbial infestation remains one of the most serious problems in agriculture. Since the difficulties associated with eliminating microorganisms such as fungi are well-recognized, a number of agents have been tested to treat plant surfaces to prevent or impair microbial infestation. However, many of said agents are not safe for humans and animals.

Furthermore, agricultural plants are today exposed to many environmental hazards such as acid rain, extensive heat, and/or UV radiation. These events result in reductions in plant yield and quality.

In addition, treating or coating plants and plant seeds with substances such as fertilizers or growth factors is common practice. However, these coatings often have the disadvantage of not being homogeneous and uniform. Furthermore, these coatings are often not stable to environmental conditions and are easily washed off during rain.

Accordingly, there is a strong need for anti-pest and anti-microbial agents which are highly versatile, non-toxic, and safe for humans and animals. In addition, there is a strong need for substances which are easy to apply and protect against environmental hazards. Moreover, there is a strong need for coatings allowing the stable, homogenous and uniform attachment of active agents. Due to the increasing market of organic farming, there is a strong need for substances that are eatable and, therefore, suitable for biological cultivation.

The inventors of the present invention surprisingly found that structural polypeptides such as silk polypeptides are suitable for plant coating. In particular, they surprisingly found that pest or microbial infestation can be avoided or at least be reduced by coating a plant or plant seed with structural polypeptides such as silk polypeptides. The mechanism by which the present invention prolongates/hinders pest or microbial infestation may be by creating a surface with the structural polypeptides, where pests or microorganisms do not readily adhere, live, multiply, or colonize. In addition, the inventors of the present invention surprisingly found that ecological impacts of environmental hazards can be prevented or at least be softened/mitigated by coating a pant or plant seed with structural polypeptides such as silk polypeptides. Moreover, the inventors of the present invention surprisingly found that coating with a structural polypeptide such as a silk polypeptide coating allows the stable, homogenous and uniform attachment or fixation of compounds onto the surface of a plant or plant seed. The inventors of the present invention also surprisingly found that coating with a structural polypeptide, such as silk polypeptide, serves to protect the environment, the user/farmer, and/or animal against pesticides, mordant, mordant comprising pesticides, seed/plant dressing, or seed/plant dressing comprising pesticides.

SUMMARY OF THE INVENTION

In a first aspect, the present invention relates to the use of a structural polypeptide for plant coating or plant seed coating.

In a second aspect, the present invention relates to a method for plant coating or plant seed coating comprising the steps of
  (i) providing a formulation comprising a structural polypeptide, and
  (ii) applying the formulation comprising a structural polypeptide to the surface of a plant or plant seed, thereby forming a coating on the plant or plant seed.

In a third aspect, the present invention relates to a plant coated with a structural polypeptide.

In a fourth aspect, the present invention relates to a plant seed coated with a structural polypeptide.

In a fifth aspect, the present invention relates to a plant coated with a composition comprising a structural polypeptide.

In a sixth aspect, the present invention relates to a plant seed coated with a composition comprising a structural polypeptide.

This summary of the invention does not necessarily describe all features of the present invention. Other embodiments will become apparent from a review of the ensuing detailed description.

DETAILED DESCRIPTION OF THE INVENTION

Definitions

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Preferably, the terms used herein are defined as described in "A multilingual glossary of biotechnological terms: (IUPAC Recommendations)", Leuenberger, H. G. W, Nagel, B. and Kölbl, H. eds. (1995), Helvetica Chimica Acta, CH-4010 Basel, Switzerland).

Several documents are cited throughout the text of this specification. Each of the documents cited herein (including all patents, patent applications, scientific publications, manufacturer's specifications, instructions, GenBank Accession Number sequence submissions etc.), whether supra or infra, is hereby incorporated by reference in its entirety. Nothing herein is to be construed as an admission that the invention is not entitled to antedate such disclosure by virtue of prior invention.

In the following, the elements of the present invention will be described. These elements are listed with specific embodiments, however, it should be understood that they may be combined in any manner and in any number to create additional embodiments. The variously described examples and preferred embodiments should not be construed to limit the present invention to only the explicitly described embodiments. This description should be understood to support and encompass embodiments which combine the explicitly described embodiments with any number of the disclosed and/or preferred elements. Furthermore, any permutations and combinations of all described elements in this application should be considered disclosed by the description of the present application unless the context indicates otherwise.

The term "comprise" or variations such as "comprises" or "comprising" according to the present invention means the inclusion of a stated integer or group of integers but not the exclusion of any other integer or group of integers. The term "consisting essentially of" according to the present invention means the inclusion of a stated integer or group of integers, while excluding modifications or other integers which would materially affect or alter the stated integer. The term "consisting of" or variations such as "consists of" according to the present invention means the inclusion of a stated integer or group of integers and the exclusion of any other integer or group of integers.

The terms "a" and "an" and "the" and similar reference used in the context of describing the invention (especially in the context of the claims) are to be construed to cover both the singular and the plural, unless otherwise indicated herein or clearly contradicted by context.

The terms "polypeptide" and "protein" are used interchangeably in the context of the present invention. They refer to a long peptide-linked chain of amino acids, e.g. one that is at least 40 amino acids long.

The term "structural polypeptide", as used herein, refers to any polypeptide which comprises repeat units/repeating building blocks made of amino acids. The structural polypeptide has preferably the ability to self-assemble. In particular, the structural polypeptide is capable of forming fibrillary protein complexes in the formulation, e.g. hydrogel. The structural polypeptide may be selected from the group consisting of a silk polypeptide, keratin, collagen, and elastin or variants or combinations thereof. The structural polypeptide is preferably a recombinant polypeptide. It is particularly preferred that the structural polypeptide is a silk polypeptide such as a spider silk polypeptide. An exemplarily process for producing a silk polypeptide which may be used in the present invention is described in WO 2006/008163 and in WO 2011/120690.

The term "silk polypeptide", as used herein, refers to a polypeptide which shows, in comparison to other polypeptides, a quite aberrant amino acid composition. In particular, a silk polypeptide possesses large quantities of hydrophobic amino acids such as glycine or alanine. In addition, a silk polypeptide contains highly repetitive amino acid sequences or repetitive units (repeat units, modules), especially in their large core domain.

Based on DNA analysis, it was shown that all silk polypeptide are chains of repetitive units which further comprise a limited set of distinct shorter peptide motifs. The expressions "peptide motif" and "consensus sequence" can be used interchangeably herein. Generally, the silk consensus sequences can be grouped into four major categories: GPGXX, GGX, $A_x$ or $(GA)_n$, and spacers. These categories of peptide motifs in silk proteins have been assigned structural roles. For example, it has been suggested that the GPGXX motif is involved in a β-turn spiral, probably providing elasticity. The GGX motif is known to be responsible for a glycine-rich $3_1$-helix. Both GPGXX and GGX motifs are thought to be involved in the formation of an amorphous matrix that connects crystalline regions, thereby providing elasticity of the fiber. Alanine-rich motifs typically contain 6-9 residues and have been found to form crystalline β-sheets. The spacers typically contain charged groups and separate the iterated peptide motifs into clusters. The silk polypeptide can perform self-assembly. Preferably, the silk polypeptide is a spider silk polypeptide. More preferably, the silk polypeptide, e.g. spider silk polypeptide, is a recombinant polypeptide.

The term "self-assembly", as used herein, refers to a process in which a disordered system of pre-existing polypeptides forms an organized structure or pattern as a consequence of specific, local interactions (e.g. van der Waals forces, hydrophobic interactions, hydrogen bonds, and/or salt-bridges, etc.) among the polypeptides themselves, without external direction or trigger although external factors might influence speed and nature of self-assembly. This particularly means that when two or more disordered and/or unfolded polypeptides are brought into contact, they interact with each other and consequently form a three dimensional structure. The change from a disordered system to an organized structure or pattern during self-assembly is characterized by a transition from a fluid state to a gelatinous/gel-like and/or solid state and a corresponding increase in viscosity. The transition from a fluid state to a gelatinous/gel-like state can be monitored, for example, by optical measurement or rheology. These techniques are known to the skilled person. The transition from a fluid state to a solid state can be monitored, for example, using optical methods.

The term "hydrogel", as used herein, refers to a structure that is formed if the concentration of structural polypeptides is high enough to build a continuous network by which the liquid component is immobilized. Said network is preferably formed by self-assembling of the structural polypeptides providing the basis of the silk hydrogel. In particular, the hydrogel is a hydrophilic polymeric network of structural polypeptides. Said network is stabilized by chemical and/or physical interactions between the structural polypeptides. The network is dispersed throughout an immobilized aqueous phase. The hydrophilicity and stability of the hydrogel permits the penetration and absorption of water (swelling) without dissolving, thus, maintaining its three-dimensional (3D) structure and function.

The term "compound", as used herein, refers to any compound having a purpose that may be useful in the present invention, e.g. a compound that can be applied to the surface of a plant or plant seed, a compound that can be added to a coating formulation, a compound that can be applied to the final coating, or a compound that can be fixed onto the plant or plant seed via the coating. The compound may be selected from the group consisting of mordant, mordant comprising pesticides, seed/plant dressing, seed/plant dressing comprising pesticides, seed/plant pickle, seed/plant pickle comprising pesticides, dyestuff, odoriferous substance, sunscreen, fertilizer, pesticide, hormone, growth factor, and nutrient. The term "compound" or "additive" may be used interchangeable herein. In particular, the compound is an active agent. The active agent may be selected from the group consisting of dyestuff, odoriferous substance, sunscreen, fertilizer, pesticide, hormone, growth factor, and nutrient. In a preferred embodiment, the compound, in particular the active agent, is a formulation of silk capsules (as described in EP1757276) and compound, in particular active agent. The compound, in particular the active agent, is comprised in the silk capsules, e.g. in the inner lumen/matrix of the silk capsules, and/or attached to the silk capsules, e.g. the shell of the silk capsules.

The term "pesticides", as used herein, refers to substances that are meant to control pests. In general, a pesticide is a chemical or biological agent (such as a virus, bacterium, or fungus) that deters, incapacitates, kills, or otherwise discourages pests. Target pests can include insects, plant pathogens, molluscs, nematodes (roundworms), and microbes that destroy property, cause nuisance, or spread disease, or are disease vectors. Although pesticides have benefits, some also have drawbacks, such as potential toxicity to humans and other species. The term "pesticides" also includes all of the following: herbicides, insecticides (which may include insect growth regulators, termiticides, etc.) nematicides, molluscicides, piscicides, avicides, rodenticides, bactericides, insect repellents, animal repellents, antimicrobials, fungicides, disinfectants (antimicrobial), and sanitizers.

The terms "mordant", "seed/plant dressing" seed/plant pickle" are used interchangeable herein. In agriculture, forestry, and horticulture, mordant, seed/plant dressing, or seed/plant pickle refer to chemicals with which the plants/seeds are treated (or "dressed"), e.g. prior to planting, or as young plants or seedlings. Said mordant, seed/plant dressing, or seed/plant pickle may comprise carrier material and/or fillers. Usually pesticides are comprised. Said pesticides preferably encompass herbicides, insecticides, and/or fungicides. Said pesticides more preferably encompass insecticides and/or fungicides. It is also usual to add color to make treated seed less attractive to birds if spilt and easier to see and clean up in the case of an accidental spillage.

Seed/plant treatment, dressing, or pickling can be an environmentally friendlier way of using pesticides as the amounts used can be very small. However, there are still a number of disadvantages for the environment, user/farmer, and/or animal, preferably farm animal, insect such as bee, or worm. The disadvantages include the harming of animals, preferably farm animals, insects such as bees, or worms. The disadvantages also include skin irritations of the user/farmer via dust generation or the use of solvents in order to solubilize the chemicals during preparation which are harmful for the user/farmer.

Agents such as pesticides, mordant, mordant comprising pesticides, seed/plant dressing, or seed/plant dressing comprising pesticides are often harmful to the environment or to the health of users/farmers as well as to animals, e.g. farm animals, worms, insects, in particular bees. Especially when these agents are applied to the seeds/plants in powdery form without any coating, they can be spread into the environment during or after the application onto the seeds/plants. The coating with a structural polypeptide fixes/retains these harmful agents on the seed/plant so that the agents are not spread into the environment. This helps the user/farmer to preserve their health and helps animals, preferably farm animals, worms, or insects such as bees, not to be negatively affected by these agents.

In seed/plant treatment, dressing, or pickling, the plants or seeds of a plant are treated (or "dressed") with pesticides. In this way the plants or seeds can be protected against infestation by fungi or pest diseases. In particular, the germination capacity of the seeds can be improved and illnesses, which already occur in the germ, can be counteracted. Seed/plant treatment, dressing, or pickling can prevent a loss of vitality of the plants, a reduction in the quality of the harvest and, in the worst case, a total loss of the harvest due to damaged plants or seed. Seed/plant coating is a thicker form of covering of seed/plant and may contain fertilizer, growth promoters as well as an inert carrier and a polymer outer shell. Seed dressing is also used to refer to the process of removing chaff, weed seeds and straw from a seed stock. The mordant, seed/plant dressing, or seed/plant pickle can be applied in three different states: (i) dry mordant, seed/plant dressing, or seed/plant pickle (problem: dust generation for environment and user, increased abrasion losses), (ii) liquid mordant, seed/plant dressing, or seed/plant pickle (problem: many active agents like pesticides are only soluble in organic solvents, said solvents can have an aggressive effect on seeds and impair germination capacity, considerable amounts of solvents required, which prevent dilution with water, this results in problems for environment and user), or (iii) water-based suspension mordant, seed/plant dressing, or seed/plant pickle (contains active ingredients like pesticides in finely divided, mostly crystalline form, slurried in water, new technology to apply water-insoluble substances in liquid form to seeds).

The pesticides comprised in the "mordant", "seed/plant dressing" seed/plant pickle" preferably encompass herbicides, insecticides, and/or fungicides and more preferably encompass insecticides and/or fungicides.

The term "plant", as used herein, refers to any multicellular eukaryotic life-form characterized by (i) photosynthetic nutrition (a characteristic possessed by all plants except some parasitic plants and underground orchids), in which chemical energy is produced from water, minerals, and carbon dioxide with the aid of pigments and the radiant energy of the sun, (ii) essentially unlimited growth at localized regions, (iii) cells that contain cellulose in their walls and are, therefore, to some extent rigid, (iv) the absence of organs of locomotion, resulting in a more or less stationary existence, and (v) the absence of nervous systems. The term "plant" further covers any plant which can be coated with a structural polypeptide such as silk polypeptide. The term "plant" also covers a seedling, a growing plant as well as a full-grown plant. The plant coated herein preferably comprises (a) root(s) and (a) sprout(s). The sprout(s) may also be designated as aboveground part(s) of the plant. The plant preferably further comprises fruits and/or blossoms/flower petals. It should be clear that a plant, in particular (a/an) sprout(s) of a plant/aboveground part(s)

of a plant, also comprise(s) leaves/leafage. The plant may be a seedling, a growing plant, or a full-grown plant. Preferably, the term "plant" covers any plant, e.g. seedling, growing plant, or full-grown plant, until plant harvest or harvest of the fruits or blooms of the plant.

The term "plant seed", as used herein, refers to an embryonic plant enclosed in a protective outer covering. The formation of the seed is part of the process of reproduction in seed plants, the spermatophytes. The term "plant seed" further covers any plant seed which can be coated with a structural polypeptide such as silk polypeptide.

The term "pest", as used herein, refers to any living organism, whether animal, plant, microorganism, e.g. bacterium or fungus, or virus, which is invasive or troublesome to plants or plant seeds. It is a loose definition, as an organism can be a pest in one setting but beneficial, domesticated or acceptable in another. Pests often occur in high densities, making the damage they do even more detrimental. Animals are called pests for plants or plant seeds when they cause damage to agriculture by feeding on plants or plant seeds. Plants may be considered pests themselves as an invasive species. The animal groups of greatest importance as pests (in order of economic importance) are insects, mites, nematodes, and/or gastropods. Plant pests can be classed as monophagous, oligophagous, and polyphagous according to how many hosts they have. Alternatively, they can be divided by feeding type, whether biting and chewing; piercing and sucking; or lapping and chewing. Another approach is to class them by population presence as key pests, occasional pests, and potential pests. Examples of pests include, but are not limited to insects, mites, nematodes, slugs, snails, protozoa, or other invertebrate animals, microorganisms such as bacteria or fungi, viruses, other parasitic plants, or parasitic plant parts.

The term "pest infestation", as used herein, refers to an attack by any living stage of pests, e.g. insects, mites, nematodes, slugs, snails, protozoa, or other invertebrate animals, microorganisms such as bacteria or fungi, viruses, other parasitic plants, or parasitic plant parts, that can injure, infect, or damage any plant or plant seed. The term "pest infestation" further refers to a state where the plant or plant seed is invaded or overrun by one or more pests. It also refers to the occurrence of one or more pest species in a plant or plant seed area or location where their numbers and impact are currently or potentially at intolerable levels. Alternatively, it refers to a sudden increase in destructiveness or population numbers of one or more pest species in a given area of a plant or plant seed.

In one preferred embodiment, the pest infestation is an infestation by predators/natural enemies. In one another preferred embodiment, the pest infestation is an infestation by microorganism (i.e. microbial infestation).

The term "coating", as used herein, refers to a covering that is applied to the plant or plant seed, in particular to the surface of the plant or plant seed, to be coated. The coating itself may be an all-over coating, completely covering the plant or plant seed, or it may only cover parts of the plant or plant seed. The coating may be applied to (parts of) the root(s) of the plant and/or sprout(s) of the plant/aboveground part(s) of the plant. The coating may also be applied to (parts of) the fruits and/or blossoms/flower petals of the plant. In a particular embodiment, the fruits and/or blossoms/flower petals are excluded from the coating. It should be clear that a plant, in particular (a/an) sprout(s) of a plant/aboveground part(s) of a plant, also comprise(s) leaves/leafage. Thus, the coating preferably also covers the leaves/leafage. The coating is preferably applied pre-harvest, e.g. to a seedling, a growing plant, or full-grown plant.

Preferably, the coating is (only) applied to the sprout(s) of the plant/aboveground part(s) of the plant. The sprout(s) of the plant/aboveground part(s) of the plant may comprise an all-over coating, completely covering the sprout(s) of the plant/aboveground part(s) of the plant, or it may only cover parts of the sprout(s) of the plant/aboveground part(s) of the plant. The plant may be a seedling, a growing plant, or a full-grown plant. In one embodiment, the coating covers at least 1%, preferably at least 30%, more preferably at least 50%, even more preferably at least 80%, and most preferably at least 90% or even 100% of the surface of the sprout(s) of the plant/aboveground part(s) of the plant. In one another embodiment, the coating covers at least 1%, preferably at least 30%, more preferably at least 50%, even more preferably at least 80%, and most preferably at least 90% or even 100% of the surface of the plant seed. Preferably, the coating is an uniform and/or homogenous coating. It has preferably a thickness of between 10 nm and 1 mm and more preferably a thickness of between 50 nm and 0.5 μm. In case the coating is applied by spraying with the help of crop dusters, surface means the surface which is accessible from the top.

The coating may be a film or gel, in particular hydrogel. The structural polypeptides to be coated can be in form of an aerosol, a liquid, a gel, a paste, a semi-solid, or a solid. The coating is preferably achieved by dip coating and/or spray coating.

The coating is preferably formed from a formulation comprising a structural polypeptide and a solvent. The formulation can be a solution, a suspension, dispersion, or powder. The formulation can also be a hydrogel. Preferably, the formulation is a solution or hydrogel. The solution may be an aqueous solution or a buffered aqueous solution. The suspension may be an aqueous suspension or a buffered aqueous suspension. The dispersion may be an aqueous dispersion or a buffered aqueous dispersion. The solvent may be water ($H_2O$), an aqueous buffer, or an organic solvent. The concentration of the structural polypeptide in the formulation, e.g. solution or hydrogel, is preferably in the range of between 0.001% (w/w) and 30% (w/w). More preferably, the concentration of the structural polypeptide in the formulation, e.g. solution or hydrogel, is in the range of between 0.01% (w/w) and 20% (w/w). Even more preferably, the concentration of the structural polypeptide in the formulation, e.g. solution or hydrogel, is in the range of between 0.1% (w/w) and 10% (w/w). Most preferably, the concentration of the structural polypeptide in the formulation, e.g. solution or hydrogel, is in the range of between 0.8% (w/w) and 5% (w/w) or in the range of between 1% (w/w) and 2% (w/w).

The plant coating or plant seed coating may comprise one or more layers which are identical of different from each other, e.g. 1, 2, 3, 4, 5, or 6 layer(s). For example, the layers may comprise a structural polypeptide or comprise a structural polypeptide and one or more compounds. Thus, layers comprising a structural polypeptide may alternate with layers comprising a structural polypeptide and one or more compounds. It is also possible that a layer which does not comprise a structural polypeptide but one or more compounds is covered by a layer comprising a structural polypeptide or by a layer comprising a structural polypeptide and one or more compounds. Said one or more compounds may be selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, hormones, growth factors, and nutrients.

The term "environmental hazard", as used herein, refers to a substance, a state or an event which has the potential to threaten the surrounding natural environment, in particular the plants or plant seeds being part of it, or adversely affects the health of plants and/or the quality of plant seeds, such as UV radiation, acid rain, extensive heat, dry periods, and/or cold periods. The term "environmental hazard", as used herein, further encompasses any single or combination of toxic chemical, biological, or physical agent(s) in the environment, resulting from human activities or natural processes that may impact the health of exposed plants or plant seeds. Preferably, the environmental hazards are selected from the group consisting of UV radiation, acid rain, extensive heat, dry periods, and/or cold periods.

The term "protection of the environment and/or the user against pesticides, mordant, seed/plant dressing, or seed/plant pickle", as used herein, refers to the following: Seed/plant dressing or seed/plant pickling can be an environmentally friendlier way of using pesticides as the amounts used can be very small. However, there are still a number of disadvantages for the environment, user/farmer, and/or animal, preferably farm animal, insect such as bee, or worm. The disadvantages include the harming of animals, preferably farm animals, insects such as bees, or worms. The disadvantages also include skin irritations of the user/farmer via dust generation or the use of solvents in order to solubilize the chemicals during preparation which are harmful for the user/farmer.

The coating of plants or plant seeds with a structural polypeptide forms a layer on top of the pesticides, mordant, seed/plant dressing, or seed/plant pickle and/or the structural polypeptide coating incorporates pesticides, mordant, seed/plant dressing, or seed/plant pickle. In this way, the coating comprising a structural polypeptide protects the environment, the user/farmer, and/or the animal, preferably farm animal, insect such as bee, or worm, against pesticides, mordant, seed/plant dressing, or seed/plant pickle which might be harmful. In particular, the coating with a structural polypeptide fixes/retains these harmful agents on the seed/plant so that the agents are not spread into the environment. This helps the user/farmer to preserve their health and helps animals, preferably farm animals, worms, or insects such as bees, not to be negatively affected by these agents.

The term "non-covalent linkage" means a type of linkage (interaction) that does not involve the sharing of pairs of electrons, but rather involves more dispersed variations of electromagnetic interactions, ionic (electrostatic) interactions, hydrophobic interactions, and/or van der Waals interactions.

Embodiments of the Invention

The inventors of the present invention surprisingly found that structural polypeptides such as silk polypeptides are suitable for plant coating. In particular, they surprisingly found that pest or microbial infestation can be avoided or at least be reduced by coating a plant or plant seed with structural polypeptides such as silk polypeptides. The mechanism by which the present invention prolongates/hinders pest or microbial infestation may be by creating a surface with the structural polypeptides, where pests or microorganisms do not readily adhere, live, multiply, or colonize. In addition, the inventors of the present invention surprisingly found that ecological impacts of environmental hazards can be prevented or at least be softened/mitigated by coating a pant or plant seed with structural polypeptides such as silk polypeptides. Moreover, the inventors of the present invention surprisingly found that a structural polypeptide such as a silk polypeptide coating allows the stable, homogenous and uniform attachment or fixation of compounds onto the surface of a plant or plant seed. The inventors of the present invention also surprisingly found that coating with a structural polypeptide, such as silk polypeptide, serves to protect the environment, the user/farmer, and/or animal against pesticides, mordant, mordant comprising pesticides, seed/plant dressing, or seed/plant dressing comprising pesticides. The structural polypeptide, such as silk polypeptide, coating is further eatable and, therefore, allows application of the structural polypeptide, such as silk polypeptide, coating in organic farming/biological cultivation.

Thus, in a first aspect, the present invention relates to the use of a structural polypeptide for plant coating or plant seed coating.

The coating covering the plant or plant seed has preferably the form of a film or gel, in particular hydrogel. The structural polypeptide used for the coating can be in form of an aerosol, a liquid, a gel, a paste, a semi-solid, or a solid. The coating itself may be an all-over coating, completely covering the plant or plant seed, or it may only cover parts of the plant or plant seed. The structural polypeptide may be used to coat (parts of) the root(s) of the plant and/or sprout(s) of the plant/aboveground part(s) of the plant. The structural polypeptide may also be used to coat (parts of) the fruits and/or blossoms/flower petals of the plant. In a particular embodiment, the fruits and/or blossoms/flower petals are excluded from the coating. It should be clear that a plant, in particular (a/an) sprout(s) of a plant/aboveground part(s) of a plant, also comprise(s) leaves/leafage. Thus, the structural polypeptide is preferably also used to coat the leaves/leafage of the plant. In case the plant is a seedling, the structural polypeptide is preferably used to coat the root(s) of the seedling and/or sprout(s) of the seedling/aboveground part(s) of the seedling. Preferably, the structural polypeptide is (only) used to coat the sprout(s) of the plant/aboveground part(s) of the plant. In one preferred embodiment, the structural polypeptide is used to coat at least 1%, preferably at least 30%, more preferably at least 50%, even more preferably at least 80%, and most preferably at least 90% or even 100% of the surface of the plant, in particular sprout(s) of the plant/aboveground part(s) of the plant, e.g. at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%, or 100% of the surface of the plant, in particular sprout(s) of the plant/aboveground part(s) of the plant. In one preferred embodiment, the structural polypeptide is used to coat at least 1%, preferably at least 30%, more preferably at least 50%, even more preferably at least 80%, and most preferably at least 90% or even 100% of the surface of the plant seed, e.g. at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%, or 100% of the surface of the plant seed.

Preferably, the coating is a homogenous and/or an uniform coating. It has preferably a thickness of between 10 nm and 1 mm and more preferably a thickness of between 50 nm and 0.5 μm. The plant may be a seedling, a growing plant, or a full-grown plant.

In one preferred embodiment, the plant coating or plant seed coating serves to protect against pest infestation.

The inventors of the present invention surprisingly found that the structural polypeptide coating changes the plant and plant seed surface in a way that it is not attractive to pests anymore. The pests do not colonize the coated plant or plant seed material anymore. In particular, the coated plant or plant seed material does not represent an attractive food source for the pests anymore.

The pests may be selected from the group consisting of insects, mites, nematodes, slugs, snails, protozoa, or other invertebrate animals, microorganisms such as bacteria or fungi, viruses, other parasitic plants, and parasitic plant parts. It is preferred that the pests are predators/natural enemies, e.g. agricultural pests or pests of ornamental plants. It is more preferred that the predators/natural enemies are selected from the group consisting of insects, mites, nematodes, slugs, snails, and microorganisms. Even more preferably, the predators/natural enemies are selected from the group consisting of lice, slugs, aphids (Aphidoidea), spider mites (Tetranychidae), whiteflies (Aleyrodoidea), weevil (Curculionidae), snails (Gastropoda), (apple) codling moth (*Cydia pomonella*), box tree moth (*Cydalima perspectalis*), Colorado beetle (*Leptinotarsa decemlineata*), rhododendron leafhopper (*Graphocephala fennahi*), and click beetle (Elateridae).

As mentioned above, the pests, in particular the predators/natural enemies, are microorganisms or viruses. Preferably, the microorganism are selected from the group consisting of bacteria, fungi In this case, the plant coating or plant seed coating serves to protect against microbial/microorganism infestation.

In one preferred embodiment, the plant coating or plant seed coating serves to protect against environmental hazards.

Environmental influences such as wind, heavy rainfall, and/or severe drought negatively influence the health of plants or plant seeds. The result of said environmental influences is crop loss and reduced yields.

The inventors of the present invention surprisingly found that the structural polypeptide coating forms an additional layer on the plant or plant seed protecting the plant or plant seed from environmental substances and effects that adversely affect the health of plants and the quality of plant seeds.

Preferably, the environmental hazards are selected from the group consisting of UV radiation, acid rain, extensive heat, dry periods, cold periods, and combinations thereof.

In one preferred embodiment, the plant or plant seed coating serves to protect the environment, the user, and/or the animal, preferably farm animal, worm, insect such as bee, against pesticides, mordant, mordant comprising pesticides, seed/plant dressing, seed/plant dressing comprising pesticides, seed/plant pickle, or seed/plant pickle comprising pesticides. Plant or plant seed coating with pesticides, mordant, mordant comprising pesticides, seed/plant dressing, seed/plant dressing comprising pesticides, seed/plant pickle, or seed/plant pickle comprising pesticides may have the disadvantage of causing skin irritations, burn in the eyes, cough, and/or asthma. Pesticides are in general harmful to the health of users/farmers or animals.

The inventors of the present invention surprisingly found that the structural polypeptide coating which forms a(n) (additional) layer on the plant or plant seed coated with pesticides, mordant, mordant comprising pesticides, seed/plant dressing, or seed/plant dressing comprising pesticides protects the environment and/or the user against said pesticides, mordant, mordant comprising pesticides, seed/plant dressing, or seed/plant dressing comprising pesticides. In other words, the pesticides, mordant, mordant comprising pesticides, seed/plant dressing, or seed/plant dressing comprising pesticides form(s) a first layer on the plant or plant seed and the structural polypeptide coating forms an additional second layer above the first layer which protects the environment and/or the user from the ingredients comprised in the first layer.

This protective effect can also be achieved when the structural polypeptide and the pesticides, mordant, mordant comprising pesticides, seed/plant dressing, or seed/plant dressing comprising pesticides are part of a single/common layer covering/coating the plant or plant seed. In this case, the pesticides, mordant, mordant comprising pesticides, seed/plant dressing, or seed/plant dressing comprising pesticides are incorporated or encapsulated within the structural polypeptide coating/layer.

Preferably, the mordant, seed/plant dressing, or seed/plant pickle comprise fungicides, herbicides, and/or insecticides. More preferably, the mordant, seed/plant dressing, or seed/plant pickle comprise fungicides and/or insecticides.

In one preferred embodiment, the plant or plant seed coating allows fixation/attachment of one or more compounds onto the plant or plant seed.

The inventors of the present invention surprisingly found that the structural polypeptide coating allows the fixation/attachment of one or more compounds onto the plant or plant seed material.

The one or more compounds are preferably attached via the structural polypeptide coating to the plant or plant seed. In particular, the structural polypeptide forms a non-covalent bond with the one or more compounds. In other words, the one or more compounds are non-covalently linked to the structural polypeptide. In another embodiment, the structural polypeptide forms a covalent bond with the one or more compounds e.g. via tyrosine or cysteine. It is particularly preferred that the one or more compounds are attached/linked to the structural polypeptide via an ionic (electrostatic) linkage (interaction) or via a hydrophobic linkage (interaction).

The one or more compounds may be selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, hormones, growth factors, and nutrients. In particular, the one or more compounds may be active agents. The active agents may be selected from the group consisting of dyestuffs, odoriferous substances, sunscreens, fertilizers, pesticides, hormones, growth factors, and nutrients.

Preferably, the pesticides are selected from the group consisting of herbicides, insecticides (which may include insect growth regulators, termiticides, etc.) nematicides, molluscicides, piscicides, avicides, rodenticides, bactericides, insect repellents, animal repellents, antimicrobials, fungicides, disinfectants (antimicrobial), and sanitizers.

In case of mordant, seed/plant dressing, or seed/plant pickle as compound, the plant or plant seed may comprise a first layer comprising the mordant, seed/plant dressing, or seed/plant pickle on the plant or plant seed and a second layer comprising the structural polypeptide. Said second layer is positioned above/coates the first layer and, thus, allows the fixation/attachment of the mordant, seed/plant dressing, or seed/plant pickle on the plant or plant seed.

The second layer may also comprise, in addition to the structural polypeptide, the mordant, seed/plant dressing, or seed/plant pickle.

Alternatively, only a single/common layer comprising the mordant, seed/plant dressing, or seed/plant pickle and the structural polypeptide is formed on the plant or plant seed.

Due to the incorporation and/or encapsulation of the mordant, seed/plant dressing, or seed/plant pickle into the structural polypeptide layer, the mordant, seed/plant dressing, or seed/plant pickle is fixed/attached on the plant or plant seed.

The mordant, seed/plant dressing, or seed/plant pickle may comprise pesticides, e.g. fungicides, herbicides, and/or insecticides.

It is preferred that the plant is a crop or the plant seed is a crop plant seed. Preferably, the crop is selected from the group consisting of a fruit tree, cereal, legume, sweet small-plant fruit, vegetable, herb, spice, an oil producing plant, and a commodity plant.

In particular, the plant or plant seed belongs to the poaceae, rubiaceae, crassulaceae, fabaceae, asteraceae, or musaceae family.

The poaceae family is a large and nearly ubiquitous family of monocotyledonous flowering plants known as grasses. Poaceae includes the cereal grasses, bamboos and the grasses of natural grassland, and cultivated lawns and pasture. The Poaceae are the most economically important plant family providing staple foods from domesticated cereal crops such as maize, wheat, rye, rice, oat, barley, hop or millet as well as forage, building materials (bamboo, thatch, straw) and fuel (ethanol). Blue fescue also belongs to this family.

The Rubiaceae are a family of flowering plants, commonly known as the coffee, madder, or bedstraw family. It consists of terrestrial trees, shrubs, lianas, or herbs that are recognizable by simple, opposite leaves with interpetiolar stipules.

The Crassulaceae, also known as the stonecrop family or the orpine family, are a family of dicotyledons with succulent leaves. They are generally herbaceous but there are some subshrubs, and relatively few treelike or aquatic plants. The houseleek belongs to this family.

The Fabaceae or Leguminosae, commonly known as the legume, pea, or bean family, are a large and economically important family of flowering plants. It includes trees, shrubs, and perennial or annual herbaceous plants, which are easily recognized by their fruit (legume) and their compound, stipulated leaves.

The asteraceae family or compositae (commonly referred to as the aster, daisy, composite, or sunflower family) is a very large and widespread family of flowering plants (Angiospermae). Asteraceae is an economically important family providing products such as cooking oils, lettuce, sunflower seeds, artichokes, sweetening agents, coffee substitutes, and herbal teas.

The musaceae family is native to the tropics of Africa and Asia. Cultivated bananas are commercially important members of this family.

It is also preferred that the plant is a decorative plant or the plant seed is a decorative plant seed. Preferably, the decorative plant is selected from the group consisting of a foliage plant, blooming plant, and carnivorous plant. It is further preferred that the plant is an economic plant or the plant seed is a decorative plant seed for logging.

The plant coating using a structural polypeptide is preferably performed during the culture period of the plant. It is also preferred that the plant coating using a structural polypeptide is performed during the blooming and/or harvesting time of the plant. The plant seed is preferably coated using a structural polypeptide during storage and/or before seeding. The coating using a structural polypeptide does not impair the growth and/or viability of the plant or the germinability of the plant seed. In addition, the coating is edible.

In one more preferred embodiment, the structural polypeptide is comprised in a composition. The composition is preferably a film or gel, in particular hydrogel, or powder. The composition is part of the coating. In other words, the coating comprises, essentially consists of or consists of the composition. Preferably, the composition further comprises one or more compounds. The one or more compounds may be selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, hormones, growth factors, and nutrients. In particular, the one or more compounds may be active agents. The active agents may be selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, hormones, growth factors, and nutrients. Preferably, the pesticides are selected from the group consisting of herbicides, insecticides (which may include insect growth regulators, termiticides, etc.) nematicides, molluscicides, piscicides, avicides, rodenticides, bactericides, insect repellents, animal repellents, antimicrobials, fungicides, disinfectants (antimicrobial), and sanitizers.

The coating (comprising the structural polypeptide, comprising the composition which comprises the structural polypeptide, or comprising the composition which comprises the structural polypeptide and the one or more compounds) is formed from a formulation. The formulation used for plant or plant seed coating can be a solution, a suspension, a dispersion, or powder. The formulation used for plant or plant seed coating can also be a hydrogel. Preferably, the formulation used for plant or plant seed coating is a solution or hydrogel. The solution may be an aqueous solution or a buffered aqueous solution. The suspension may be an aqueous suspension or a buffered aqueous suspension. The dispersion may be an aqueous dispersion or a buffered aqueous dispersion. The formulation may comprise a solvent. The solvent may be water ($H_2O$), an aqueous buffer, or an organic solvent. As pesticides are very often insoluble in water, an organic solvent (e.g. 1,2-propandiol) is used when they are formulated as mordant, seed/plant dressing, or seed/plant pickle. The formulation comprises the structural polypeptide or the structural polypeptide and the one or more compounds. The concentration of the structural polypeptide in the formulation, e.g. solution or hydrogel, is preferably in the range of between 0.001% (w/w) and 30% (w/w), e.g. 0.001, 0.01, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 6, 7, 8, 9, 10, 11, 12, 13, 14, 15, 16, 17, 18, 19, 20, 21, 22, 23, 24, 25, 26, 27, 28, 29, or 30% (w/w). More preferably, the concentration of the structural polypeptide in the formulation, e.g. solution or hydrogel, is in the range of between 0.01 (w/w) and 20% (w/w). Even more preferably, the concentration of the structural polypeptide in the formulation, e.g. solution or hydrogel, is in the range of between 0.1% (w/w) and 10% (w/w). Most preferably, the concentration of the structural polypeptide in the formulation, e.g. solution or hydrogel, is in the range of between 0.8% (w/w) and 5% (w/w) or in the range of between 1% (w/w) and 2% (w/w). The concentration of the one or more compounds in the formulation, e.g. solution or hydrogel, is preferably in the range of between 0.1 mg/ml and 500 g/l, e.g. 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 200, 300, 400, or 500 mg/ml, or 1, 10, 50, 100, 200, 300, 400, or 500 g/l.

The final coating onto the plant or plant seed has preferably the form of a film (in case a solution comprising the structural polypeptide is applied to the plant or plant seed) or hydrogel (in case a hydrogel is applied to the plant or plant seed). The final coating onto the plant or plant seed can also have the form of a powdery layer (in case powder is applied to the plant or plant seed).

The structural polypeptide is preferably a self-assembling polypeptide. Said self-assembling polypeptide has the potential to self-assemble into fibrillary structures (i.e. fibrillary complexes of structural polypeptides).

It is preferred that the (self-assembling) structural polypeptide is selected from the group consisting of a silk polypeptide, keratin, collagen, and elastin. In particular, the (self-assembling) structural polypeptide is a recombinant polypeptide, e.g. a recombinant silk polypeptide, keratin, collagen, or elastin.

It is more preferred that the (self-assembling) structural polypeptide is a silk polypeptide, e.g. a recombinant silk polypeptide. The (recombinant) silk polypeptide may be a spider silk polypeptide, e.g. a major ampullate silk polypeptide such as a dragline silk polypeptide, a minor ampullate silk polypeptide, or a flagelliform silk polypeptide of an orb-web spider. Preferably, the silk polypeptide is a spider silk polypeptide, more preferably a recombinant spider silk polypeptide.

It is (alternatively or additionally) more preferred that the silk polypeptide is a polypeptide with an amino acid sequence which comprises or consists of at least 50%, 60%, 65%, 70%, 75%, 80%, 85%, or 90% multiple copies of repetitive units. It is even more preferred that the silk polypeptide is a polypeptide with an amino acid sequence which comprises or consists of at least 95% multiple copies of repetitive units. Said repetitive units may be identical or different.

It is further (alternatively or additionally) more preferred that the silk polypeptide comprises at least two identical repetitive units. For example, the silk polypeptide may comprise between 2 to 100 repetitive units, e.g. 2, 3, 4, 5, 6, 7, 8, 9, 10, 11, 12, 13, 14, 15, 16, 17, 18, 19, 20, 21, 22, 23, 24, 25, 26, 27, 28, 29, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 repetitive units.

It is also (alternatively or additionally) more preferred that the silk polypeptide consists of between 40 to 3000 amino acids. It is even more preferred that the silk polypeptide consists of between 40 to 1500 amino acids or between 200 to 1200 amino acids. It is most preferred that the silk polypeptide consists of between 250 to 600 amino acids.

It is even more preferred that the silk polypeptide comprises at least two identical repetitive units. In one embodiment, the repetitive units are independently selected from the group consisting of module C (SEQ ID NO: 1) or a variant thereof and module $C^{Cys}$ (said module may also be designated as module $C^{C}$) (SEQ ID NO: 2). Module $C^{Cys}$ (SEQ ID NO: 2) is a variant of module C (SEQ ID NO: 1). In this module, the amino acid S (Ser) at position 25 has been replaced by the amino acid C (Cys).

The module C variant differs from the reference module C from which it is derived by up to 1, 2, 3, 4, 5, 6, 7, 8, 9, or 10, 11, 12, 13, 14, or 15 amino acid changes in the amino acid sequence (i.e. substitutions, additions, insertions, deletions, N-terminal truncations and/or C-terminal truncations). Such a module variant can alternatively or additionally be characterized by a certain degree of sequence identity to the reference module from which it is derived. Thus, the module C variant has a sequence identity of at least 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99% or even 99.9% to the respective reference module C. Preferably, the sequence identity is over a continuous stretch of at least 5, 10, 15, 18, 20, 24, 27, 28, 30, 34, or more amino acids, preferably over the whole length of the respective reference module C.

The sequence identity may be at least 80% over the whole length, may be at least 85% over the whole length, may be at least 90% over the whole length, may be at least 95% over the whole length, may be at least 98% over the whole length, or may be at least 99% over the whole length of the respective reference module C. Alternatively, the sequence identity may be at least 80% over a continuous stretch of at least 5, 10, 15, 18, 20, 24, 28, or 30 amino acids, may be at least 85% over a continuous stretch of at least 5, 10, 15, 18, 20, 24, 28, or 30 amino acids, may be at least 90% over a continuous stretch of at least 5, 10, 15, 18, 20, 24, 28, or 30 amino acids, may be at least 95% over a continuous stretch of at least 5, 10, 15, 18, 20, 24, 28, or 30 amino acids, may be at least 98% over a continuous stretch of at least 5, 10, 15, 18, 20, 24, 28, or 30 amino acids, or may be at least 99% over a continuous stretch of at least 5, 10, 15, 18, 20, 24, 28, or 30 amino acids of the respective reference module C.

A fragment (or deletion) variant of module C has preferably a deletion of up to 1, 2, 3, 4, 5, 6, 7, 8, 9, 10, 11, 12, 13, 14, or 15 amino acids at its N-terminus and/or at its C-terminus. The deletion can also be internally.

Additionally, the module C variant or fragment is only regarded as a module C variant or fragment within the context of the present invention, if the modifications with respect to the amino acid sequence on which the variant or fragment is based do not negatively affect the ability of the silk polypeptide to coat a plant or plant seed. The skilled person can readily assess whether the silk polypeptide comprising a module C variant or fragment is still capable of coating a plant or plant seed. In this respect, it is referred to the examples comprised in the experimental part of the present patent application.

$C^{Cys}$ variants may also be encompassed by the present invention. Regarding the $C^{Cys}$ variants, the same explanations/definitions apply which have been made with respect to the module C variant (see above).

It is also even more preferred that the silk polypeptide comprises at least one non-repetitive (NR) unit. Said non-repetitive (NR) unit may be comprised at the N- and/or C-terminus. In one embodiment, the NR unit is selected from the group consisting of NR3 (SEQ ID NO: 3) or a variant thereof, and NR4 (SEQ ID NO: 4) or a variant thereof. The NR3 (SEQ ID NO: 3) unit is based on the amino acid sequence of ADF-3 of the spider Araneus diadematus and the NR4 (SEQ ID NO: 4) unit is based on the amino acid sequence of ADF-4 of the spider Araneus diadematus (WO 2006/008163).

Regarding the NR3 or NR4 unit variant, the same explanations/definitions apply which have been made with respect to the module C variant (see above).

In addition, a NR3 or NR4 unit variant or fragment is only regarded as a NR3 or NR4, unit variant or fragment within the context of the present invention, if the modifications with respect to the amino acid sequence on which the variant or fragment is based do not negatively affect the ability of the silk polypeptide to coat a plant or plant seed. The skilled person can readily assess whether the silk polypeptide comprising a NR3 or NR4 unit variant or fragment is still capable of coating a plant or plant seed. In this respect, it is referred to the examples comprised in the experimental part of the present patent application.

Preferably, the silk polypeptide is selected from the group consisting of $(C)_m$, $(C^{Cys})_m$, $(C)_m C^{Cys}$, $(C)_m NR_z$, $NR_z(C)_m$, and $NR_z(C)_m NR_z$, wherein m is an integer of 8 to 96, i.e. 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, or 96, z is an integer of 1 to 3, i.e. 1, 2, or 3, and NR stands for a non-repetitive unit.

More preferably, the silk polypeptide is selected from the group consisting of $C_{16}NR4$, $C_{32}NR4$, $C_8$, $C_{16}$, $C_{32}$, $C_{48}$, $C_8 C^{Cys}$, $C_{16} C^{Cys}$, $C_{32} C^{Cys}$, $C_{48} C^{Cys}$, $C^{Cys} C_8$, $C^{Cys} C_{16}$, $C^{Cys} C_{32}$, and $C^{Cys} C_{48}$.

The plant coating or plant seed coating may comprise one or more layers which are identical of different from each other. For example, the layers may comprise a structural polypeptide or comprise a structural polypeptide and one or more compounds. Thus, layers comprising a structural polypeptide may alternate with layers comprising a structural polypeptide and one or more compounds. It is also possible that a layer which does not comprise a structural polypeptide but one or more compounds is covered by a layer comprising a structural polypeptide or by a layer comprising a structural polypeptide and one or more compounds. Said one or more compounds may be selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, hormones, growth factors, and nutrients.

The first aspect of the present invention, as described above, can alternatively be worded as follows: In a first aspect, the present invention relates to a method of using a structural polypeptide for plant coating or plant seed coating.

In a second aspect, the present invention relates to a method for plant coating or plant seed coating (with a structural polypeptide) comprising the steps of:
(i) providing a formulation comprising a structural polypeptide, and
(ii) applying the formulation comprising a structural polypeptide to the surface of a plant or plant seed, thereby forming a coating (comprising the structural polypeptide) on the plant or plant seed.

The formulation may be a solution, a suspension, a dispersion, or powder. The formulation may also be a hydrogel. Preferably, the formulation is a solution or hydrogel. The solution may be an aqueous solution or a buffered aqueous solution. The suspension may be an aqueous suspension or a buffered aqueous suspension. The dispersion may be an aqueous dispersion or a buffered aqueous dispersion. The formulation preferably comprises a solvent. The solvent may be water ($H_2O$), an aqueous buffer, or an organic solvent. As pesticides are very often insoluble in water, an organic solvent (e.g. 1,2-propandiol) is used when they are formulated as mordant, seed/plant dressing, or seed/plant pickle. Preferably, the concentration of the structural polypeptide in the formulation, e.g. solution or hydrogel, is in the range of between 0.001% (w/w) and 30% (w/w), e.g. 0.001, 0.01, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 6, 7, 8, 9, 10, 11, 12, 13, 14, 15, 16, 17, 18, 19, 20, 21, 22, 23, 24, 25, 26, 27, 28, 29, or 30% (w/w). More preferably, the concentration of the structural polypeptide in the formulation, e.g. solution or hydrogel, is in the range of between 0.01% (w/w) and 20% (w/w). Even more preferably, the concentration of the structural polypeptide in the formulation, e.g. solution or hydrogel, is in the range of between 0.1% (w/w) and 10% (w/w). Most preferably, the concentration of the structural polypeptide in the formulation, e.g. solution or hydrogel, is in the range of between 0.8% (w/w) and 5% (w/w) or in the range of between 1% (w/w) and 2% (w/w). The concentration of the one or more compounds in the formulation, e.g. solution or hydrogel, is preferably in the range of between 0.1 mg/ml and 500 g/l, e.g. 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 200, 300, 400, or 500 mg/ml, or 1, 10, 50, 100, 200, 300, 400, or 500 g/l.

The coating itself may be an all-over coating, completely covering the plant or plant seed or it may only cover parts of the plant or plant seed. Preferably, the coating covers at least 1%, more preferably at least 50%, even more preferably at least 80%, and most preferably at least 90% or even 100%, of the plant or plant seed, e.g. at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%, or 100% of the plant or plant seed.

The coating may be applied to (parts of) (a/an) root(s) of a plant and/or sprout(s) of a plant/aboveground part(s) of a plant. The coating may also be applied to (parts of) fruits and/or blossoms/flower petals of a plant. In a particular embodiment, the fruits and/or blossoms/flower petals are excluded from the coating. It should be clear that a plant, in particular (a/an) sprout(s) of a plant/aboveground part(s) of a plant, also comprise(s) leaves/leafage. Thus, the coating preferably also covers the leaves/leafage. Preferably, the coating is (only) applied to (a/an) sprout(s) of a plant/ aboveground part(s) of a plant. More preferably, the coating is (only) applied to (a) root(s) of a plant and/or to (a/n) sprout(s) of a plant/aboveground part(s) of a plant.

Thus, in one preferred embodiment, the method for plant coating or plant seed coating comprises the steps of:
(i) providing a formulation comprising a structural polypeptide, and
(ii) applying the formulation comprising a structural polypeptide to the surface of (a) root(s) of a plant and/or (a/an) sprout(s) of a plant/aboveground part(s) of a plant, thereby forming a coating on the root(s) of the plant and/or sprout(s) of the plant/aboveground part(s) of the plant.

The root(s) of the plant and/or sprout(s) of the plant/aboveground part(s) of the plant may comprise an all-over coating, completely covering the root(s) of the plant and/or sprout(s) of the plant/aboveground part(s) of the plant, or may comprise a coating only covering parts of the root(s) of the plant and/or sprout(s) of the plant/aboveground part(s) of the plant. In case the plant is a seedling, for example, the root(s) of the seedling and/or sprout(s) of the seedling/aboveground part(s) of the seedling may comprise an all-over coating, completely covering the root(s) of the seedling and/or sprout(s) of the seedling/aboveground part(s) of the seedling, or may comprise a coating only covering parts of the root(s) of the seedling and/or sprout(s) of the seedling/aboveground part(s) of the seedling.

Preferably, the coating covers at least 1%, more preferably at least 30%, even more preferably at least 50%, and most preferably at least 90% or even 100%, of the surface of the root(s) of the plant and/or sprout(s) of the plant/aboveground part(s) of the plant, e.g. at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%, or 100% of the surface of the root(s) of the plant and/or sprout(s) of the plant/aboveground part(s) of the plant.

Preferably, the coating covers at least 1%, more preferably at least 30%, even more preferably at least 50%, and most preferably at least 90% or even 100%, of the surface of the plant seed, e.g. at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%, or 100% of the plant seed.

The plant may be a seedling, a growing plant, or a full-grown plant. Thus, the coating is preferably applied pre-harvest.

The formulation comprising a structural polypeptide is preferably applied by dip coating and/or spray coating to the surface of a plant, in particular sprout of a plant/aboveground part(s) of a plant, or plant seed.

For example, the dip coating may take place as follows: (i) immersing a plant, in particular (a/an) spout(s) of a plant/aboveground part(s) of a plant, or a plant seed into a container containing a formulation comprising a structural polypeptide and a solvent (ii) incubating the plant, in particular the spout(s) of the plant/aboveground part(s) of the plant, or plant seed with the formulation comprising the structural polypeptide and the solvent in the tank, e.g. for a period between 0.1 sec to 10 min, (iii) removing the plant, in particular the spout(s) of the plant/aboveground part(s) of the plant, or plant seed which is (are) coated on its (their) surface with the structural polypeptide from the formulation. The plant, in particular the spout(s) of the plant/aboveground part(s) of the plant, which is (are) coated on its (their) surface with the structural polypeptide can further be dried, e.g. at ambient temperature, room temperature, or elevated temperatures.

For example, the spray coating may take place as follows: (i) transferring a formulation comprising a structural polypeptide and a solvent into a spray can, spraying device, or nebulizer, and (ii) distributing the formulation comprising the structural polypeptide and the solvent onto a plant, in particular (a/an) sprout(s) of a plant/aboveground part(s) of a plant, or plant seed. The plant, in particular the spout(s) of the plant/aboveground part(s) of the plant, or plant seed which is (are) coated on its (their) surface with the structural polypeptide can further be dried, e.g. at ambient temperature, at room temperature, or at elevated temperatures.

In a preferred embodiment, the formulation comprising a structural polypeptide can be sprayed/applied to plants/crops with the help of crop dusters.

The temperature is preferably in the range of between 0° C. and 40° C., more preferably in the range of 10° C. and 40° C., even more preferably in the range of between 20° C. and 35° C., and most preferably in the range of between 20° C. and 25° C., e.g. 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40° C.

Preferably, the formulation further comprises one or more compounds. Thus, in one preferred embodiment, the method for plant coating or plant seed coating comprises the steps of:
(i) providing a formulation comprising a structural polypeptide and one or more compounds, and
(ii) applying the formulation comprising a structural polypeptide and one or more compounds to the surface of a plant or plant seed, thereby forming a coating on the plant or plant seed.

Preferably, one or more compounds are applied to the (final) coating. Thus, in one preferred embodiment, the method for plant coating or plant seed coating comprises the steps of:
(i) providing a formulation comprising a structural polypeptide,
(ii) applying the formulation comprising a structural polypeptide to the surface of a plant or plant seed, thereby forming a coating on the plant or plant seed, and
(iii) applying one or more compounds to the coating formed in step (ii).

More preferably, the one or more compounds are part of the formulation provided in step
(i) and are applied to the (final) coating after step (ii). Thus, in one more preferred embodiment, the method for plant coating or plant seed coating comprises the steps of:
(i) providing a formulation comprising a structural polypeptide and one or more compounds,
(ii) applying the formulation comprising a structural polypeptide and one or more compounds to the surface of a plant or plant seed, thereby forming a coating on the plant or plant seed, and
(iii) applying one or more compounds to the coating formed in step (ii).

The one or more compounds are preferably applied to the (final) coating before drying said coating/before it is dry. The one or more compounds may be applied to the coating as follows: The one or more compounds may be sprinkled over the (wet, moist or not yet dry) coating, a solution comprising said one or more compounds may be casted over the coating, a solution comprising said one or more compounds may be sprayed over the coating, a solution, dispersion or solid comprising said one or more compounds may be applied to the plant before the coating or the coating may be dipped into a solution comprising said one or more compounds.

It is also preferred that the one or more compounds are applied to the surface of a plant or plant seed before the structural polypeptide coating, e.g. before step (i) or after step (i)/before step (ii). In this case, the formulation comprising a structural polypeptide is applied to the surface of a plant or plant seed which (already) comprises/is coated with one or more compounds.

It is further preferred that the one or more compounds are applied to the surface of a plant or plant seed before the structural polypeptide coating, e.g. before step (i) or after step (i)/before step (ii), and that (subsequently) a formulation comprising a structural polypeptide and one or more compounds is applied to the surface of the plant or plant seed. In this case, the formulation comprising a structural polypeptide and one or more compounds is applied to the surface of a plant or plant seed which (already) comprises/is coated with one or more compounds.

The one or more compounds may be selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, hormones, growth factors, and nutrients. In particular, the one or more compounds are active agents. The active agents may be selected from the group consisting of dyestuffs, odoriferous substances, sunscreens, fertilizers, pesticides, hormones, growth factors, and nutrients. Preferably, the pesticides are selected from the group consisting of herbicides, insecticides (which may include insect growth regulators, termiticides, etc.) nematicides, molluscicides, piscicides, avicides, rodenticides, bactericides, insect repellents, animal repellents, antimicrobials, fungicides, disinfectants (antimicrobial), and sanitizers.

It is particularly preferred that the formulation further comprises mordant, seed/plant dressing, or seed/plant pickle as compound. Thus, in one particularly preferred embodiment, the method for plant coating or plant seed coating comprises the steps of:
  (i) providing a formulation comprising a structural polypeptide and mordant, seed/plant dressing, or seed/plant pickle, and
  (ii) applying the formulation comprising a structural polypeptide and mordant, seed/plant dressing, or seed/plant pickle to the surface of a plant or plant seed, thereby forming a coating on the plant or plant seed.

It is particularly preferred that a formulation comprising mordant, seed/plant dressing, or seed/plant pickle as compound is applied first before a formulation comprising a structural polypeptide is added. Thus, in one particularly preferred embodiment, the method for plant coating or plant seed coating comprises the steps of:
  (i) providing a formulation comprising mordant, seed/plant dressing, or seed/plant pickle, and
  (ii) applying the formulation comprising mordant, seed/plant dressing, or seed/plant pickle to the surface of a plant or plant seed, thereby forming a coating on the plant or plant seed, and
  (iii) applying a formulation comprising a structural polypeptide to the coating formed in step (ii).

It is particularly preferred that a formulation comprising mordant, seed/plant dressing, or seed/plant pickle as compound is applied first before a formulation comprising a structural polypeptide and mordant, seed/plant dressing, or seed/plant pickle is added. Thus, in one particularly preferred embodiment, the method for plant coating or plant seed coating comprises the steps of
  (i) providing a formulation comprising mordant, seed/plant dressing, or seed/plant pickle,
  (ii) applying the formulation comprising mordant, seed/plant dressing, or seed/plant pickle to the surface of a plant or plant seed, thereby forming a coating on the plant or plant seed, and
  (iii) applying a formulation comprising a structural polypeptide and mordant, seed/plant dressing, or seed/plant pickle to the coating formed in step (ii).

It is preferred that the mordant, seed/plant dressing, or seed/plant pickle comprises pesticides. It is more preferred that the mordant, seed/plant dressing, or seed/plant pickle comprises fungicides, herbicides, and/or insecticides. It is even more preferred that the mordant, seed/plant dressing, or seed/plant pickle comprises fungicides and/or insecticides.

The formulation may be a solution, a suspension, a dispersion, or powder. In case the formulation comprises a structural polypeptide, it is preferred that the formulation is a solution, a suspension, or a dispersion. In case the formulation does not comprise a structural polypeptide but mordant, seed/plant dressing, or seed/plant pickle, the formulation is preferably a solution, a suspension, a dispersion, or powder.

A dry mordant, seed/plant dressing or seed/plant pickle, a liquid mordant, seed/plant dressing or seed/plant pickle, or a water-based suspension mordant, seed/plant dressing or seed/plant pickle may be used as formulation.

The application of the above mentioned formulations on the seed/plant fixes the mordant, seed/plant dressing, or seed/plant pickle on the plant/seed so that the mordant, seed/plant dressing or seed/plant pickle is not spread into the environment. This helps the user/farmer to preserve their health and helps animals, preferably farm animals, worms, or insects such as bees not to be negatively affected by the agents.

Preferably, the method further comprises the step of drying the coating of the plant or plant seed. Thus, in one preferred embodiment, the method for plant coating or plant seed coating comprises the steps of:
  (i) providing a formulation comprising a structural polypeptide,
  (ii) applying the formulation comprising a structural polypeptide to the surface of a plant or plant seed, thereby forming a coating on the plant or plant seed, and
  (iii) drying the coating.

In one more preferred embodiment, the method for plant coating or plant seed coating comprises the steps of:
  (i) providing a formulation comprising a structural polypeptide and one or more compounds,
  (ii) applying the formulation comprising a structural polypeptide and one or more compounds to the surface of a plant or plant seed, thereby forming a coating on the plant or plant seed, and
  (iii) drying the coating.

In one more preferred embodiment, the method for plant coating or plant seed coating comprises the steps of:
  (i) providing a formulation comprising a structural polypeptide, (ii) applying the formulation comprising a structural polypeptide to the surface of a plant or plant seed, thereby forming a coating on the plant or plant seed,
(iii) applying one or more compounds to the coating formed in step (ii), and
(iv) drying the coating obtained in step (iii).

In one even more preferred embodiment, the method for plant coating or plant seed coating comprises the steps of:
(i) providing a formulation comprising a structural polypeptide and one or more compounds,
(ii) applying the formulation comprising a structural polypeptide and one or more compounds to the surface of a plant or plant seed, thereby forming a coating on the plant or plant seed,
(iii) applying one or more compounds to the coating formed in step (ii), and
(iv) drying the coating obtained in step (iii).

Also the embodiments encompassing the application of one or more compounds before the structural polypeptide coating are preferably dried after the structural polypeptide coating.

The drying of the coating can take place in the ambient air (passive) or the drying can be supported by increasing the temperature or by application of air flow (active). The drying can be carried out at ambient temperature, at room temperature, or at elevated temperatures, e.g. between 0° C. and 40° C., preferably between 10° C. and 40° C., even more preferably between 20° C. and 35° C., and most preferably between 20° C. and 25° C., e.g. at 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40° C. The drying may be performed over a time range of between 1 s and 180 min, preferably between 10 s and 60 min, e.g. over 1, 10, 20, 30, 40, 50, 60 s or 1, 2, 3, 4, 5, 6, 7, 8, 9, 10, 20, 30, 40, 50, 60, 70, 80, 90, 100, 110, 120, 130, 140, 150, 160, 170, 180 min.

The final coating onto the plant, in particular sprout of a plant/aboveground part(s) of a plant, or plant seed has preferably the form of a film (in case a solution comprising the structural polypeptide is applied to the plant or plant seed) or hydrogel (in case a hydrogel is applied to the plant or plant seed).

The plant coating using a structural polypeptide is preferably performed during the culture period of the plant. It is also preferred that the plant coating using a structural polypeptide is performed during the blooming and/or harvesting time of the plant. The plant seed is preferably coated using a structural polypeptide during storage and/or before seeding. The coating using a structural polypeptide does not impair the growth and/or viability of the plant or the germinability of the plant seed. In addition, the coating is edible. Bioengineered silk does not generate a physiological response from the immune system and produce no side effects (Lin Romer, "The future of medical implants: Bioengineered silk for better biocompatibility", Medical Plastics News (MPN), Juni 2018).

Preferably, the coating is a homogenous and/or an uniform coating. It has preferably a thickness of between 10 nm and 1 mm and more preferably a thickness of between 50 nm and 0.5 μm.

The structural polypeptide is preferably a self-assembling polypeptide. Preferably, the (self-assembling) structural polypeptide is selected from the group consisting of a silk polypeptide, keratin, collagen, and elastin. In particular, the (self-assembling) structural polypeptide is a recombinant polypeptide, e.g. a recombinant silk polypeptide, keratin, collagen, or elastin.

The silk polypeptide preferably comprises at least two identical repetitive units.

In one preferred embodiment, the repetitive units are independently selected from the group consisting of module C (SEQ ID NO: 1) or a variant thereof and module $C^{Cys}$ (said module may also be designated as module $C^C$) (SEQ ID NO: 2). Module $C^{Cys}$ (SEQ ID NO: 2) is a variant of module C (SEQ ID NO: 1).

In one more preferred embodiment, the silk polypeptide comprises at least one non-repetitive (NR) unit. Said non-repetitive (NR) unit may be comprised at the N- and/or C-terminus. In one embodiment, the NR unit is selected from the group consisting of NR3 (SEQ ID NO: 3) or a variant thereof, and NR4 (SEQ ID NO: 4) or a variant thereof.

In one even more preferred embodiment, the silk polypeptide is selected from the group consisting of $(C)_m$, $(C^{Cys})_m$, $(C)_m C^{Cys}$, $(C)_m NR_z$, $NR_z(C)_m$, and $NR_z(C)_m NR_z$, wherein m is an integer of 8 to 96, i.e. 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95 or 96, z is an integer of 1 to 3, i.e. 1, 2, or 3, and NR stands for a non-repetitive unit.

In one most preferred embodiment, the silk polypeptide is selected from the group consisting of $C_{16}NR4$, $C_{32}NR4$, $C_8$, $C_{16}$, $C_{32}$, $C_{48}$, $C_8 C^{Cys}$, $C_{16} C^{Cys}$, $C_{32} C^{Cys}$, $C_{48} C^{Cys}$, $C^{Cys} C_8$, $C^{Cys} C_{16}$, $C^{Cys} C_{32}$, and $C^{Cys} C_{48}$.

As to further embodiments, in particular preferred embodiments, of the structural polypeptide, it is referred to the first aspect of the present invention.

In a third aspect, the present invention relates to a plant coated with a structural polypeptide. The coating has preferably the form of a film or gel, in particular hydrogel.

The plant coated with a structural polypeptide is preferably obtainable/obtained by the method according to the second aspect of the present invention.

In a fourth aspect, the present invention relates to a plant seed coated with a structural polypeptide. The coating has preferably the form of a film or gel, in particular hydrogel.

The plant seed coated with a structural polypeptide is preferably obtainable/obtained by the method according to the second aspect of the present invention.

The plant coating or plant seed coating may comprise one or more layers which are identical of different from each other. For example, the layers may comprise a structural polypeptide or comprise a structural polypeptide and one or more compounds. Thus, layers comprising a structural polypeptide may alternate with layers comprising a structural polypeptide and one or more compounds. It is also possible that a layer which does not comprise a structural polypeptide but one or more compounds is covered by a layer comprising a structural polypeptide or by a layer comprising a structural polypeptide and one or more compounds. Said one or more compounds may be selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, hormones, growth factors, and nutrients.

In a fifth aspect, the present invention relates to a plant coated with a composition comprising a structural polypeptide. The coating comprising or consisting of the composition is preferably a film or gel, in particular hydrogel. Preferably, the composition further comprises one or more compounds. More preferably, the one or more compounds are selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, herbicides, fungicides, hormones, growth factors, and nutrients. Even more preferably, the pesticides are selected from the group consisting of herbicides, insecticides (which may include insect growth regulators, termiticides, etc.) nematicides, molluscicides, piscicides, avicides, rodenticides, bactericides, insect repellents, animal repellents, antimicrobials, fungicides, disinfectants (antimicrobial), and sanitizers.

The plant coated with a composition comprising a structural polypeptide is preferably obtainable/obtained by the method according to the second aspect of the present invention.

In a sixth aspect, the present invention relates to a plant seed coated with a composition comprising a structural polypeptide.

The coating comprising or consisting of the composition is preferably a film or gel, in particular hydrogel. Preferably, the composition further comprises one or more compounds. More preferably, the one or more compounds are selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, herbicides, fungicides, hormones, growth factors, and nutrients. Even more preferably, the pesticides are selected from the group consisting of herbicides, insecticides (which may include insect growth regulators, termiticides, etc.) nematicides, molluscicides, piscicides, avicides, rodenticides, bactericides, insect repellents, animal repellents, antimicrobials, fungicides, disinfectants (antimicrobial), and sanitizers. The plant seed coated with a composition comprising a structural polypeptide is preferably obtainable/obtained by the method according to the second aspect of the present invention.

According to the third to sixth aspect of the present invention, the coating itself may be an all-over coating, completely covering the plant or plant seed, or it may only cover parts of the plant or plant seed. Thus, in one embodiment, the coating covers at least 1%, preferably at least 30%, more preferably at least 50%, even more preferably at least 80%, and most preferably at least 90% or even 100%, of the plant or plant seed, e.g. at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%, or 100% of the plant or plant seed.

The coating may further cover (only) a sprout of a plant/aboveground part(s) of a plant. Thus, in one embodiment, the coating covers at least 1%, preferably at least 30%, more preferably at least 50%, even more preferably at least 80%, and most preferably at least 90% or even 100%, of the plant or plant seed, e.g. at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%, or 100% of the sprout of the plant/aboveground part(s) of the plant.

Preferably, the coating is a homogenous and/or an uniform coating. It has preferably a thickness of between 10 nm and 1 mm and more preferably a thickness of between 50 nm and 0.5 μm. The plant may be a seedling, a growing plant, or a full-grown plant.

It is preferred that the plant is a crop or the plant seed is a crop plant seed. Preferably, the crop is selected from the group consisting of a fruit tree, cereal, legume, sweet small-plant fruit, vegetable, herb, spice, an oil producing plant, and a commodity plant.

In particular, the plant or plant seed belongs to the poaceae, rubiaceae, crassulaceae, fabaceae, asteraceae, or musaceae family.

It is also preferred that the plant is a decorative plant or the plant seed is a decorative plant seed. Preferably, the decorative plant is selected from the group consisting of a foliage plant, blooming plant, and carnivorous plant.

As to further embodiments and preferred embodiments, e.g. with respect to the structural polypeptide, it is referred to the first aspect of the present invention.

Various modifications and variations of the invention will be apparent to those skilled in the art without departing from the scope of invention. Although the invention has been described in connection with specific preferred embodiments, it should be understood that the invention as claimed should not be unduly limited to such specific embodiments. Indeed, various modifications of the described modes for carrying out the invention which are obvious to those skilled in the art in the relevant fields are intended to be covered by the present invention.

BRIEF DESCRIPTION OF THE FIGURES

The following figures are merely illustrative of the present invention and should not be construed to limit the scope of the invention as indicated by the appended claims in any way.

FIG. 1A shows wheat spray coated with silk hydrogel (left) compared to control (right) at the beginning of the test and after 16 days (FIG. 1B). FIG. 1C shows blue fescue dip coated with silk solution (right) compared to control (left) at the beginning of the test and after one month (FIG. 1D). FIG. 1E shows bamboo dip coated with silk solution (middle), spray coated with silk solution (right) compared to control (left) at the beginning of the test and after one month (FIG. 1F). FIG. 1G shows coffee spray coated with silk hydrogel (left) compared to control (right) at the beginning of the test and after 16 days (FIG. 1H). FIG. 1I shows houseleek dip coated with silk solution (middle), spray coated with silk solution (right) compared to control (left) at the beginning of the test and after one month (FIG. 1J).

FIG. 2B shows the infestation of the lettuce leaves with three slugs after 14 h (right: lettuce leaf coated with silk solution, left: control leaf). All three slugs (square framed and numbered 1, 2, 3) infested the control leaf. No infestation of the lettuce leaf treated with silk solution could be observed.

EXAMPLES

Figure 1A:
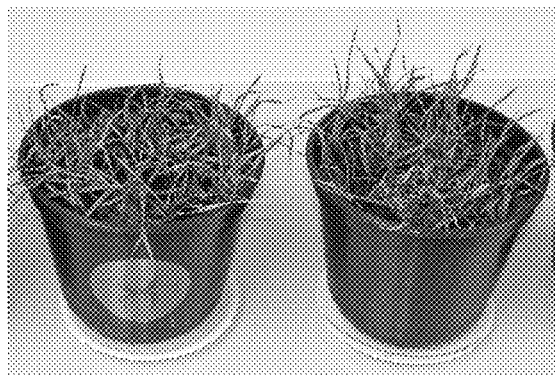
FIGS. 1A-1J: The aboveground parts of the test plants wheat, blue fescue, bamboo, coffee and houseleek were coated via dip coating or spray coating of with silk hydrogel or silk solution with protein concentrations of 1 to 2%. According to the test plants control plants were sprayed or dipped with water. The viability of houseleek was monitored for 5 days. After 5 days (wheat), 16 days (coffee, wheat) and one month (blue fescue and bamboo) the coated plants were compared to the control plants which were sprayed or dipped with water. No difference in viability could be detected between control plants and coated test plants. Also, no difference was detected between spray coating and dip coating. Furthermore, no difference was detected between silk hydrogel and silk solution
Figure 1B:
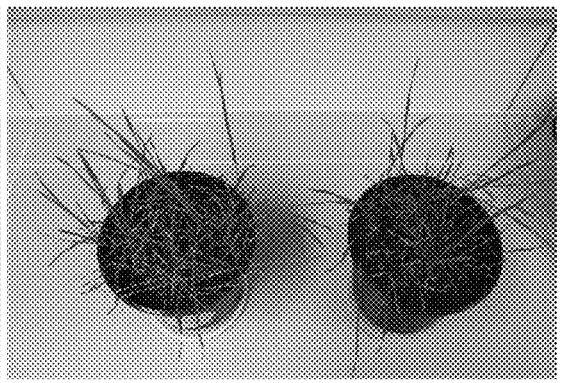
Figure 1C:
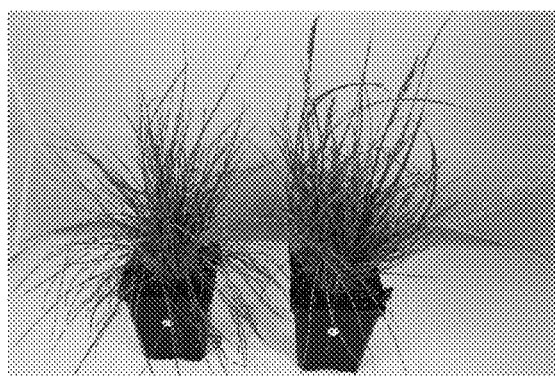
Figure 1D:
Figure 1E:
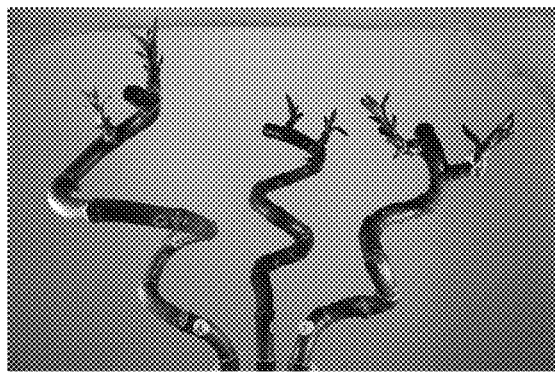
Figure 1F:
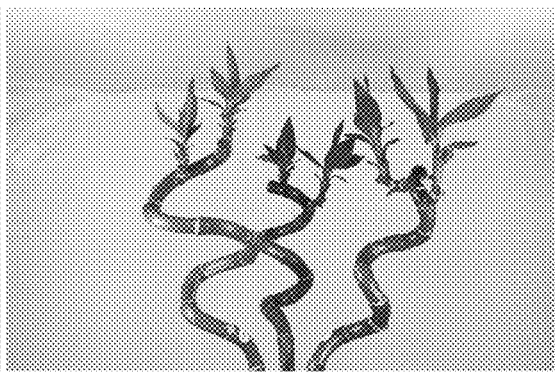
Figure 1G:
Figure 1H:
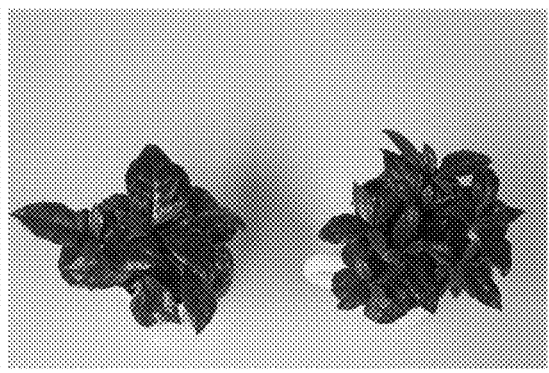
Figure 1I:
Figure 1J:
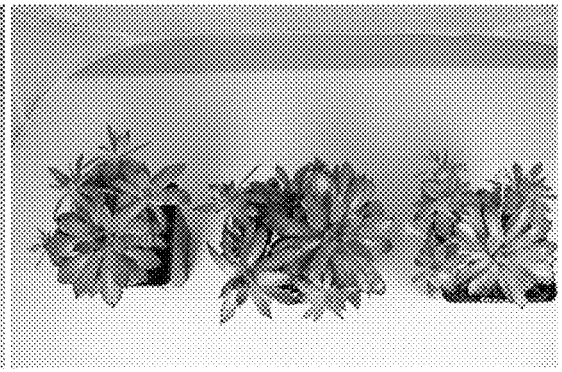

The examples given below are for illustrative purposes only and do not limit the invention described above in any way.

Example 1: Preparation of $C_{16}$ Silk Hydrogels a) Preparation of $C_{16}$ protein:

The $C_{16}$ protein was prepared as described in WO 2006/008163.

b) Preparation of an Aqueous $C_{16}$ Protein Solution:

For the preparation of the protein solutions, the silk proteins were dissolved in 6 M GdmSCN and 50 mM Tris/HCl, pH 8.0. In order to remove the GmdSCN, protein solutions at a volume of <500 mL were dialyzed against 5 mM Tris/HCl, pH 8.0 using a Spectra/Por Dialysis Membrane with a MWCO of 6000-8000. After dialysis, the protein solution was filtered via crossflow filtration (VIVAFLOW 200, Hydrosat, 10 kDa) in order to further remove the GmdSCN and to concentration the protein in the solution.

At a volume of the protein solution of >500 mL, the GmdSCN was removed and the protein solution was concentrated without dialysis using a crossflow unit (Sartorius AG, Göttingen) with SARTOCON Slice Cassettes (Filter material: Hydrosat with 10 kDa cut off).

The $C_{16}$ protein concentrations were determined by measuring the absorbance at 276 nm using the UV/Vis spectroscopy (Beckman Coulter). The final protein concentrations $C_{16}$ protein solution were between 1% and 2% (w/w) correspondent to the coating method described below.

c) Preparation of $C_{16}$ Hydrogel

For the preparation of the $C_{16}$ hydrogel, the silk proteins were dissolved in 6 M GdmSCN and 50 mM Tris/HCl, pH 8.0. In order to remove the GmdSCN, protein solutions at a volume of <500 mL were dialyzed against 5 mM Tris/HCl, pH 8.0 using a Spectra/Por Dialysis Membrane with a MWCO of 6000-8000. After dialysis, the protein solution was filtered via crossflow filtration (VIVAFLOW 200, Hydrosat, 10 kDa) in order to further remove the GmdSCN and to concentration the protein in the solution.

At a volume of the $C_{16}$ hydrogel of >500 mL, the GmdSCN was removed and the protein solution was concentrated using a crossflow unit (Sartorius AG, Göttingen) with SARTOCON Slice Cassettes (Filter material: Hydrosat with 10 kDa cut off).

The $C_{16}$ protein concentrations were determined by measuring the absorbance at 276 nm using the UV/Vis spectroscopy (Beckman Coulter). The final protein concentrations $C_{16}$ protein solution were between 1% and 2% (w/w) correspondent to the coating methods described below. To obtain $C_{16}$ hydrogel, the protein solutions were stored for >5 days at room temperature or for >16 h at 40° C. for gelation.

Example 2: Coating of Plants a) Spray Coating

The following plants were used for coating experiments: Poaceae: wheat, bamboo; Rubiaceae: coffee; Crassulaceae: houseleek A $C_{16}$ hydrogel or $C_{16}$ solution with protein concentrations of 1 to 2% were applied to different plant surfaces (wheat, bamboo, coffee, houseleek) via spraying at a temperature of 20-25° C. (Flasche ELLIPS 50 ml Nr. 00041, Hartwig Kröger GmbH) with a spraying device (Zerstauberpumpe 00355+00352, Hartwig Kröger GmbH). $C_{16}$ hydrogel with a protein concentration of 2% was used for spray coating of wheat and coffee. $C_{16}$ solution with a protein concentration of 1.2% was used for spray coating of bamboo and houseleek. After a drying time of 10-30 min homogeneous coating was visible at all plants. It could be demonstrated that spray coating is a suitable method for homogenous coating of plants with silk hydrogel as well as with silk solution.

b) Dip Coating

The following plants were used for coating experiments: Poaceae: blue fescue, bamboo; Crassulaceae: houseleek; Fabaceae: pea Beaker glasses were filled with $C_{16}$ solution or $C_{16}$ hydrogel with protein concentrations of 1.0% and 1.2%. The whole aboveground parts of blue fescue, bamboo and houseleek plants were dipped into the $C_{16}$ solution at a temperature of 20-25° C. The whole aboveground parts of pea plants were dipped into the $C_{16}$ hydrogel at a temperature of 20-25° C. After a drying time of 10-30 min homogeneous coating was visible at all plants. It could be demonstrated that dip coating is a suitable method for homogenous coating of plants with silk solution as well as with silk hydrogel.

Example 3: Biocompatibility Test

In order to determine the biocompatibility of the silk coating on plants the following plants were coated: Poaceae: wheat, blue fescue, bamboo; Rubiaceae: coffee; Crassulaceae: houseleek. Therefore the whole aboveground parts of the test plants were coated via dip coating or spray coating of with silk hydrogel and silk solutions with protein concentrations of 1 to 2% according to example 2. According to the test plants control plants were sprayed or dipped with water.

The viability of the plants was monitored for at least 5 days. After 5 days (wheat), 16 days (coffee, wheat) and one month (blue fescue and bamboo) the coated plants were compared to the control plants. No difference in viability could be detected between control plants and silk coated test plants. Also no difference was detected between spray coating and dip coating (FIG. 1). Furthermore no difference was detected between coating plants with silk hydrogel and silk solution. It could be shown that coating of plants with silk hydrogel as well as silk solutions does not influence the viability of plants.

Example 4: Protection of Silk Coated Plants Against Pest Infestation

Figure 2A:
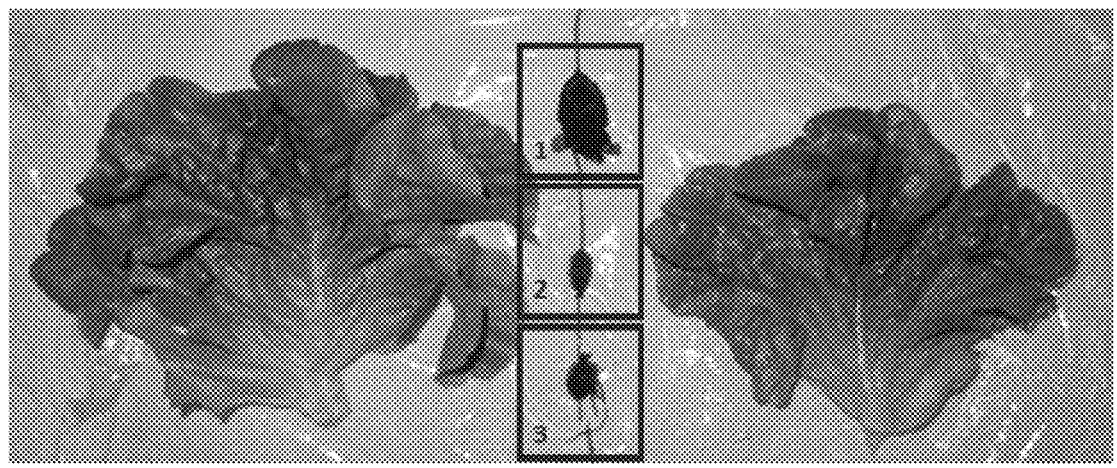
FIGS. 2A-2B: Lettuce leaves were dip coated with silk solution with a protein concentration of 1.2% at room temperature and dried for 1 h. As a control one leaf was dipped into water. The lettuce leaves were harvested from one plant. Three slugs (square framed and numbered 1, 2, 3) were collected from the same plant. The lettuce leaves were placed on a cling film, which was humidified with water (right: lettuce leaf coated with silk solution, left: control leaf). The three slugs were placed in the middle of the two lettuce leaves (FIG. 2A).
Figure 2B:
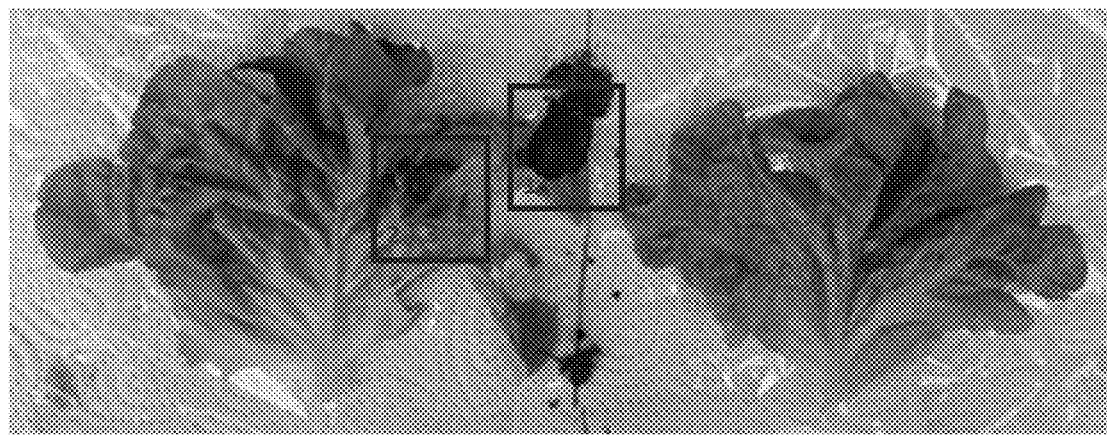

In order to demonstrate protection of silk coated plants against pest infestation two typical agricultural exemplary pests were selected: slugs and lice.

a) Protection of Silk Coated Plants Against Slug Infestation:

Lettuce leaves were dip coated according to example 2 with silk solution with a protein concentration of 1.2% at room temperature and dried for 1 h. As a control one leaf was dipped into water. The lettuce leaves were harvested from one plant. Three slugs were collected from the same plant. The lettuce leaves were placed on a cling film, which was humidified with water. The three slugs were placed in the middle between the two lettuce leaves. After 14 h the infestation of the lettuce leaves from the three slugs was determined. All three slugs infested the control leaf. No infestation of the lettuce leaf coated with silk could be observed (FIG. 2).

b) Protection of Plants Against Lice Infestation Via Dip Coating:

Pea plants were dip-coated with silk hydrogel according to example 2 for 1 min with a protein concentration of 1.0% at room temperature. A control plant was treated with water according to the coated plant. After drying over night, the pea plants were kept in a closed container with pea lice. The infestation of the plants with lice was monitored for 6 days. Louse infestation of the control plant was significantly higher compared to the silk coated plant over a period of 6 days (see Table 1). Table 1 shows physical protection pea plants against louse infestation via dip coating (number of lice on silk coated plant compared to control plant in relation to the time of infestation).

TABLE 1

Physical protection of pea plants against louse infestation via dip coating.

| Time after first contact with lice | Number of lice on control pea plant | Number of lice on pea plant coated with silk hydrogel |
|---|---|---|
| Day 0 (3.5 hours) | 3 | 1 |
| Day 1 (24 hours) | 13 | 4 |
| Day 2 (49 hours) | 25 | 7 |
| Day 2 (78 hours) | 25 | 12 |
| Day 3 (96 hours) | 30 | 14 |
| Day 3 (124 hours) | 40 | 24 |
| Day 6 (146 hours) | 31 | 25 | c) Protection of Plants Against Lice Infestation Via Spray Coating:

Pea plants were coated with silk solution via spray coating to example 2 with a protein concentration of 1.2% at room temperature. A control plant was treated with water according to the coated plant. After a drying time of 4 h the pea plants were kept in a closed container with pea lice. The infestation of the plants with lice was monitored for 5 days. Louse infestation of the control plant was significantly higher compared to the silk coated plant over a period of 5 days (see Table 2). It could be demonstrated that the lice favor the uncoated control plant and avoid the silk coated plant. Table 2 shows physical protection of pea plants against louse infestation via spray coating (number and behavior of lice on silk coated plant compared to control plant in relation to the time of infestation).

TABLE 2

Physical protection of pea plants against louse infestation via spray coating.

| Time after first contact with lice | Description |
|---|---|
| 15 min (day 1) | After 15 min four lice infested the control plant and started to suck on the first leaf immediately. No further movement or search for optimum spots were observed. |
| 25 min (day 1) | First lice infested plant coated with silk. Lice explore the plant and move up and down to find uncoated spots on the plant. No constant sucking on one spot observed. |
| Day 2 | Severe lice infestation on control plant. Lice immediately find a spot for sucking on the first leaf. Only several lice could be found on the plant coated with silk. Lice move a lot to find spots for sucking. |
| Day 3 | Significantly more lice on control plant. |
| Day 4 | Significantly more lice on control plant. Vitality of control plant is bad compared to the plant coated with silk. |
| Day 5 | Number of lice in the container increased. Vitality of control plant is bad compared to the plant coated with silk. |

Both methods, i.e. dip and spray coating, are suitable for coating plants with silk to prevent lice infestation. Both formulations, i.e. silk hydrogel and silk solution are suitable for coating plants with silk to prevent lice infestation Preferably, spray coating with silk solution should be used. In particular, the initial lice infestation during the first hours could be decreased significantly by coating plants with silk. Furthermore, lice are not able to find spots for sucking and move up and down on the silk coated plant. The vitality of plants coated with silk was shown to be better compared to the control plant over 1-5 days after lice infestation.

The experiments show exemplary that silk coating allows the protection of plants from pest infestation. The exemplary findings can be applied to common pests in general.

Example 5: Fixation of Agro-Chemical Analogs on Plants

In order to demonstrate the fixation of agrochemical analogs on plants an exemplary pigment was selected: indigo carmine. The pigment has the same water solubility as standard pesticides, herbicides and fungicides (10 g/L). Silk hydrogel and silk solution with protein concentrations of 1% to 2% were used for spray and dip coating of plants for the fixation of agro-chemical analogs. The silk hydrogel or silk solution, respectively, was mixed with the pigment indigo carmine at a concentration of (5 mg/mL). As control, indigo carmine was mixed with DI-water at a concentration of 5 mg/mL (indigo carmine water solution). The silk hydrogel and silk solution coating solutions were manufactured according to example 2.

Dip Coating

For dip coating, the leaves of different plants were completely dipped into silk coating solutions (1.1% of silk protein) containing indigo carmine (5 mg/mL) and the control indigo carmine water solution at room temperature. After drying for 30 min to 180 min, a rain shower was simulated applying water with the help of a watering can. It could be demonstrated that the leaves were coated more homogenous with silk solution containing indigo carmine than the leaves coated with the control indigo carmine water solution. Less pigment was washed off the leaves by simulating a rain shower on the leaves coated with silk solution containing indigo carmine compared to the leaves coated with the control indigo carmine water solution.

Spray Coating

For spray coating, silk solution (1.0%) and silk hydrogel (2.0%) containing with indigo carmine (5 mg/mL respectively) and the control indigo carmine water solution was sprayed onto different plants at room temperature. Silk hydrogel (2%) was used for spray coating of banana plants. Silk solution (1.0%) was used for spray coating of plants. After drying for 10 min to 180 min, a rain shower was simulated applying water with the help of a watering can. It could be demonstrated for both—silk hydrogel solution (2.0%) and silk solution (1.0%)—that the plants were coated more stable and homogenous with silk hydrogel and silk solution containing indigo carmine than the plants coated with the control indigo carmine water solution. Less pigment was washed off the plants by simulating a rain shower on the plants coated with silk hydrogel and silk solution containing indigo carmine compared to the leaves coated with the control indigo carmine water solution.

The exemplary experiments with the pigment indigo carmine show that fixation of small organic molecules on plants with silk hydrogel as well as silk solution is possible. Both methods, i.e. dip and spray coating, are suitable for fixation of small organic molecules on plants. Preferably, spray coating should be used. In particular, a more homogenous coating of plants with organic molecules can be achieved applying silk and less pigment is washed off the plants by simulating a rain shower applying silk as fixation agent compared to the common methods of applying small molecules on plants.

The invention claimed is:

1. A method for protecting a plant from pest infestation and promoting plant vitality, comprising the steps of:
   (i) providing a formulation comprising a silk polypeptide in a concentration of between 0.8% (w/w) and 5% (w/w), and
   (ii) applying the formulation to the surface of a live plant exposed to pests to form a homogeneous and uniform coating comprising the silk polypeptide having a thickness of between 10 nm and 1 mm on the plant, wherein the coating protects the plant from pest infestation, thereby promoting plant vitality.

2. The method of claim 1, wherein the coating covers at least 50% of the surface of the sprout(s) of the plant.

3. The method of claim 1, wherein the coating is achieved by spray coating and/or dip coating.

4. The method of claim 1, wherein the formulation is selected from the group consisting of powder, a (hydro)gel, solution, suspension, and dispersion.

5. The method of claim 1, wherein the formulation comprises a solvent.

6. The method of claim 5, wherein the solvent is selected from the group consisting of water ($H_2O$), an aqueous buffer, and an organic solvent.

7. The method of claim 1, wherein the formulation comprises the silk polypeptide in a concentration of between 0.001% (w/w) and 30% (w/w).

8. The method of claim 1, wherein the formulation provided in step (i) further comprises one or more compounds.

9. The method of claim 1, wherein the method further comprises the step of applying one or more compounds to the coating.

10. The method of claim 8, wherein the one or more compounds are selected from the group consisting of mordant, mordant comprising pesticides, seed/plant dressing, seed/plant dressing comprising pesticides, seed/plant pickle, seed/plant pickle comprising pesticides, dyestuffs, odoriferous substances, sunscreens, fertilizers, pesticides, herbicides, fungicides, hormones, growth factors, and nutrients.

11. The method of claim 1, wherein the method further comprises the step of drying the coating of the plant or plant seed.

12. The method of claim 1, wherein the coating allows fixation of one or more compounds onto the plant.

13. The method of claim 1, wherein the pests are insects, mites, nematodes, slugs, snails, protozoa, bacteria, fungi, or viruses.

14. The method of claim 1, wherein the silk polypeptide is a spider silk polypeptide.

15. The method of claim 1, wherein the plant is a crop or a decorative plant.

16. The method of claim 15, wherein
(i) the crop is selected from the group consisting of a fruit tree, cereal, legume, sweet small-plant fruit, vegetable, herb, spice, an oil producing plant, and a commodity plant, or
(ii) the decorative plant is selected from the group consisting of a foliage plant, blooming plant, and carnivorous plant.

17. The method of claim 1, wherein the concentration is between 1% (w/w) and 2% (w/w).

18. The method of claim 1, wherein the thickness is between 50 nm and 0.5 μm.

* * * * *